United States Patent [19]
Grider et al.

[11] Patent Number: 5,515,540
[45] Date of Patent: May 7, 1996

[54] MICROPROCESSOR WITH SINGLE PIN FOR MEMORY WIPE

[75] Inventors: Stephen N. Grider; Wendell L. Little, Denton; Michael L. Bolan, Dallas, all of Tex.

[73] Assignee: Dallas Semiconducter Corp., Dallas, Tex.

[21] Appl. No.: 174,584

[22] Filed: Dec. 28, 1993

Related U.S. Application Data

[63] Continuation of Ser. No. 573,585, Aug. 27, 1990, abandoned.

[51] Int. Cl.[6] .................. G06F 1/24; H04L 9/00
[52] U.S. Cl. .................... 395/750; 380/4
[58] Field of Search .............. 395/750; 380/4, 380/25, 50, 59

[56] References Cited

U.S. PATENT DOCUMENTS

| | | | |
|---|---|---|---|
| 4,168,396 | 9/1979 | Best | 380/4 |
| 4,558,176 | 12/1985 | Arnold et al. | 364/900 |
| 4,811,288 | 3/1989 | Kleijne | 365/52 |
| 4,823,308 | 4/1989 | Knight | 380/4 |
| 4,888,802 | 12/1989 | Cooney | 380/49 |
| 4,959,861 | 9/1990 | Howlette | 380/4 |
| 4,965,828 | 10/1990 | Ergott, Jr. et al. | 380/50 |
| 5,027,397 | 1/1991 | Double et al. | 380/4 |
| 5,048,085 | 9/1991 | Abraham et al. | 380/23 |

OTHER PUBLICATIONS

*D55000 Soft Microcontroller User's Guide,* Dallas Semiconductor Corporation, Jan. 1990.

*Primary Examiner*—Glenn A. Auve
*Attorney, Agent, or Firm*—Jenkens & Gilchrist

[57] ABSTRACT

A nonvolatile microcontroller (or microprocessor) with improved security against tampering, including attempts at active intrusion. According to this invention, a battery-backed microcontroller includes encryption and power management functions, and is combined with a battery and a volatile semiconductor memory (e.g. an SRAM). The microcontroller supplies power to the semiconductor memory (either from a system power supply or from the battery). When a security violation is detected, the microcontroller wipes its encryption registers, and also grounds the power-output pin to the memory. This will destroy all data in the volatile memory.

14 Claims, 13 Drawing Sheets

MICROPROCESSOR WITH SINGLE PIN FOR MEMORY WIPE

This application is a continuation of application Ser. No. 07/573,585, filed Aug. 27, 1990, now abandoned.

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTIONS

The present invention relates to microprocessors and microcontrollers.

Ever since the late 1970s, there has been a large and steadily increasing use of microprocessors to implement complex or "smart" systems of various kinds. These include a large number of high-volume mass-market products, such as washing machines, automobiles, televisions, etc. The number of such applications, as well as the dollar volume, has continued to increase.

However, there are many attractive applications where some degree of security is essential. Some examples of such applications might include postage meters, or automatic teller machines, or usage monitoring in rental equipment, or systems for very high software security, or usage monitoring for "pay per view" systems which can access encrypted downloadable software from a cable or broadcast channel.

The security needs of at least some such applications are inadequately met by the heretofore available technology. Some previous inventions of interest have included a microprocessor with encryption, and an electronic (e.g., U.S. Pat. No. 4,168,396 which is hereby incorporated by reference) key which can intersperse false output data with accessed data (e.g., U.S. application Ser. No. 273,698, flined Nov. 21, 1988 which is hereby incorporated by reference).

For many applications, it would be desirable not only to withstand casual tampering by users, but also to withstand determined efforts by black-market copiers. This need is not fully met by a secure system's controller which hides its communications to the system: a determined copier might open and destroy one example of a commercially available part, in order to reverse-engineer it and make numerous working copies.

The disclosed invention provides a nonvolatile microcontroller (or microprocessor) with improved security against tampering, including attempts at active intrusion. According to this invention, a battery-backed microcontroller includes encryption and power management functions, and is combined with a battery and a volatile semiconductor memory (e.g. an SRAM). The microcontroller supplies power to the semiconductor memory (either from a system power supply or from the battery). When a security violation is detected, the microcontroller wipes its encryption registers, and also grounds the power-output pin to the memory. This will destroy all data in the volatile memory. Preferably the data and CE\ lines are also grounded, to prevent any power from getting to the memory array through those lines.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

Figure 1:
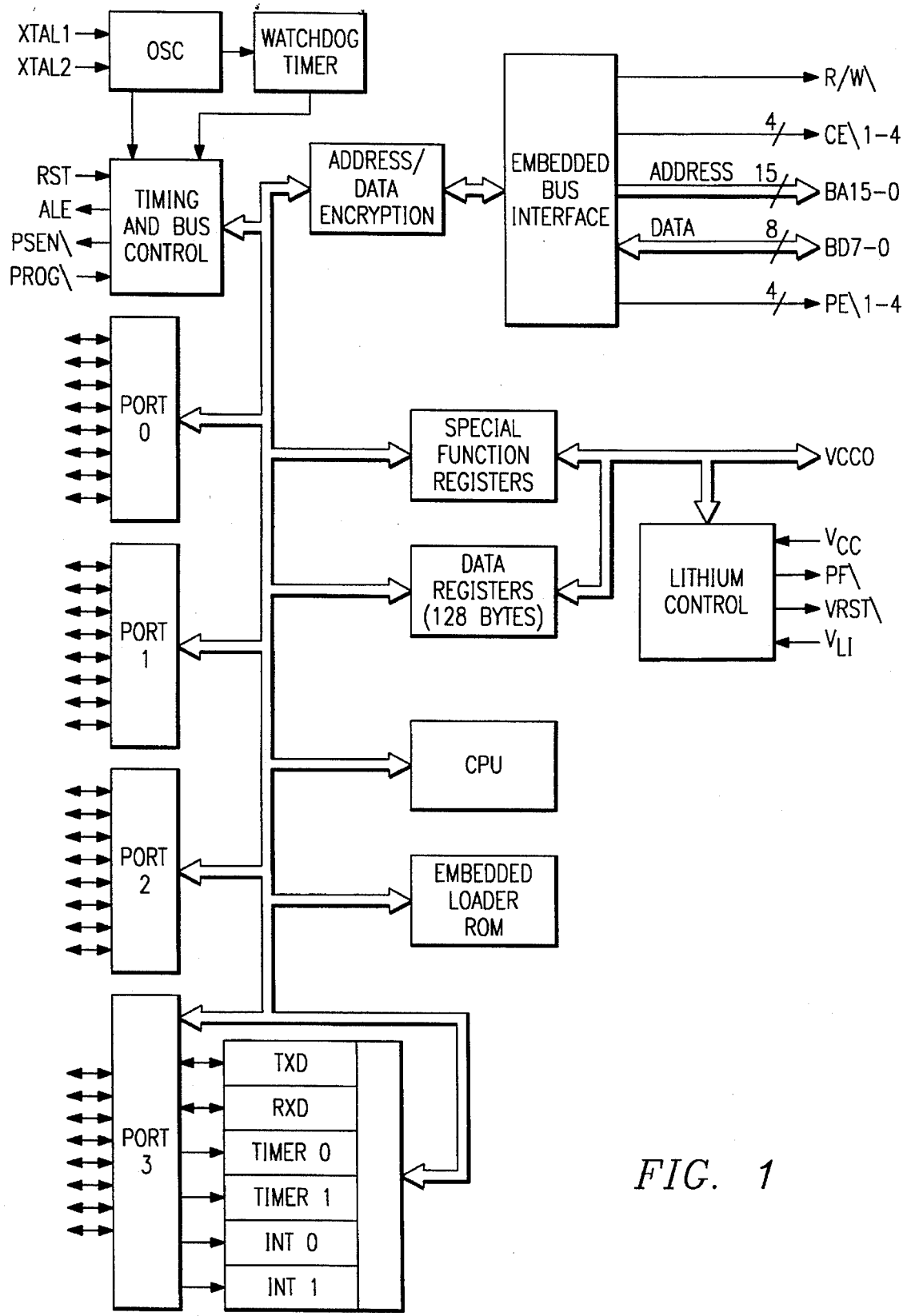
FIG. 1 is a block diagram of the microprocessor of the presently preferred embodiment.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

For clearest discussion of the context of the claimed inventions in the preferred embodiments, and for clearer discussion of the contemplated best mode of using the claimed inventions, the following text will discuss several closely related microprocessor parts:

The Intel 8051 is an industry-standard 8-bit microcontroller.

The DS5000 microcontroller has an architecture which is basically compatible with the Intel 8051 architecture, but which also includes features which make it nonvolatile (i.e. able to survive a power interruption without losing data). The DS5000 module includes an SRAM and battery, packaged together with a microcontroller chip in a standard DIP module. An embedded bus (which is not externally accessible) provides data and address lines from the microcontroller chip to the SRAM. (The DS5000FP version provides additional pinout connections for access to the embedded bus.) The DS5000T microcontroller is quite similar to the DS5000, but also includes an embedded clock/calendar.

The DS5001 microcontroller module is an upgraded modification of the DS5000, with additional features added. The DS5002 is similar to the DS5001, but includes additional security features. The DS5004 is also similar to the DS5001, but can also provide exact emulation of the DS5000. In the presently preferred embodiment, these three chips are provided by metal mask variations on an otherwise-identical mask set.

The presently preferred embodiment of the claimed invention is embodied in the DS5002 version described below. However, for fullest compliance with the best mode requirements of U.S. patent law, and to show the context of the presently preferred embodiment, several different related products will be described here. It must be noted that, while following descriptions of the various embodiments described correspond to actual or planned Dallas Semiconductor parts (as of the effective filing date of this application), there is no guarantee that these parts may not be modified, improved, or renamed. Thus, the actual part numbers in the following description are used merely for convenience, and should not be relied on: the following description (including the material incorporated therein by reference) is intended to be self-sufficient.

DS5000

The DS5000 microcontroller provides a nonvolatized modification of the Intel 8051 architecture. The DS5000 module includes an SRAM and battery, packaged together with a microcontroller chip in a standard DIP module. An embedded bus (which is not externally accessible) provides data and address lines from the microcontroller chip to the SRAM. (The DS5000FP version provides additional pinout connections for access to the embedded bus.) This integrated circuit and its data sheet are available from Dallas Semiconductor Corporation, 4350 Beltwood Parkway, Dallas, Tex. 75244, and are both hereby incorporated by reference.

The architecture of the DS5000 is exhaustively described in the (published) DS5000 Soft Microcontroller User's Guide, which is being filed as an appendix to the present application.

DS5000T

The DS5000T microcontroller is quite similar to the DS5000, but also includes an embedded clock/calendar (which permits logging of events with time and date stamp). The internal lithium cell preserves clock function in the absence of VCC.

DS5000FP

The DS5000FP Micro Chip is an 80-pin Quad Flat Pack (QFP) containing a standalone DS5000 Soft Microcontroller die which normally resides in a 40-pin DS5000 DIP package. It retains all the hardware features of a DS5000 DIP and can be used much like ROM-less versions of the 8051, except that all four ports of the DS5000FP are freed up for general-purpose I/O. An external lithium energy cell can be attached to this chip to power external SRAM(s) in the absence of Vcc. This gives the user the flexibility of using his own lithium cells and memories to implement a nonvolatile microcontroller solution with the soft features inherent in the DS5000 DIP. EPROM devices can be used for program memory in applications not requiring reloadable software.

Of the 80 pins on the package, only 68 are actually tied to pads on the die. The rest of the pins are no-connects. 40 pins of the 68 signal pins are identical in function to the 40 pins of a standard DS5000. The other 28 pins are normally used to interface to the embedded RAM and the lithium source on the standard DS5000 DIP products. For complete information, refer to the Soft Microcontroller User's Guide.
Pin Description (By Pin Number)

The pin assignments for this package according to pin number are summarized below (names with an * suffix indicate active low signals):

| PIN | SIGNAL | DESCRIPTION |
|---|---|---|
| 1 | P0.4 | Port 0 bit 4 |
| 2 | NC | No Connect |
| 3 | NC | No Connect |
| 4 | EA9 | Embedded Address line 9 |
| 5 | P0.3 | Port 0 bit 3 |
| 6 | EA8 | Embedded Address line 8 |
| 7 | P0.2 | Port 0 bit 2 |
| 8 | EA13* | Embedded Address line 13 |
| 9 | P0.1 | Port 0 bit 1 |
| 10 | ER/W* | Read/Write |
| 11 | P0.0 | Port 0 bit 0 |
| 12 | VCCO | VCC output to CMOS static RAM VCC pin |
| 13 | VCC | VCC input from system power supply |
| 14 | VCC | VCC input from system power supply |
| 15 | P1.0 | Port 1 bit 0 |
| 16 | EA14* | Embedded Address line 14 |
| 17 | P1.1 | Port 1 bit 1 |
| 18 | EA12 | Embedded Address line 12 |
| 19 | P1.2 | Port 1 bit 2 |
| 20 | EA7 | Embedded Address line 7 |
| 21 | P1.3 | Port 1 bit 3 |
| 22 | NC | No Connect |
| 23 | NC | No Connect |
| 24 | EA6 | Embedded Address line 6 |
| 25 | P1.4 | Port 1 bit 4 |
| 26 | EA5 | Embedded Address line 5 |
| 27 | P1.5 | Port 1 bit 5 |
| 28 | EA4 | Embedded Address line 4 |
| 29 | P1.6 | Port 1 bit 6 |
| 30 | EA3 | Embedded Address line 3 |
| 31 | P1.7 | Port 1 bit 7 |

-continued

| PIN | SIGNAL | DESCRIPTION |
|---|---|---|
| 32 | NC | No Connect - internally tied to substrate |
| 33 | EA2 | Embedded Address line 2 |
| 34 | RST | Reset |
| 35 | EA1 | Embedded Address line 1 |
| 36 | P3.0/RXD | Port 3 bit 0/Receive Data Input |
| 37 | EA0 | Embedded Address line 0 |
| 38 | P3.1/TXD | Port 3 bit 1/Transmit Data Output |
| 39 | P3.2/INT0* | Port 3 bit 2/Externl Interrupt Input 0 |
| 40 | P3.3/INT1* | Port 3 bit 3/External Interrupt Input 1 |
| 41 | P3.4/T0 | Port 3 bit 4/Timer Counter Input 0 |
| 42 | NC | No Connect |
| 43 | NC | No Connect |
| 44 | P3.5/T1 | Port 3 bit 5/Timer Counter Input 1 |
| 45 | P3.6/WR* | Port 3 bit 6/Write Enable |
| 46 | P3.7/RD* | Port 3 bit 7/Read Enable |
| 47 | XTAL2 | Cyrstal Input 2 |
| 48 | XTAL1 | Crystal Input 1 |
| 49 | P2.0 | Port 2 bit 0 |
| 50 | P2.1 | Port 2 bit 1 |
| 51 | P2.2 | Port 2 bit 2 |
| 52 | GND | Ground |
| 53 | GND | Ground |
| 54 | VLI | Lithium Voltage Input |
| 55 | ED0 | Embedded Data line 0 |
| 56 | P2.3 | Port 2 bit 3 |
| 57 | ED1 | Embedded Date line 1 |
| 58 | P2.4 | Port 2 bit 4 |
| 59 | ED2 | Embedded Date line 2 |
| 60 | P2.5 | Port 2 bit 5 |
| 61 | ED3 | Embedded Date line 3 |
| 62 | NC | No Connect |
| 63 | NC | No Connect |
| 64 | P2.6 | Port 2 bit 6 |
| 65 | ED4 | Embedded Date line 4 |
| 66 | P2.7 | Port 2 bit 7 |
| 67 | ED5 | Embedded Date line 5 |
| 68 | PSEN* | Program Store Enable |
| 69 | ED6 | Embedded Data line 6 |
| 70 | ALE | Address Latch Enable |
| 71 | ED7 | Embedded Date line 7 |
| 72 | NC | No Connect - internally tied to substrate |
| 73 | EA* | External Access Enable |
| 74 | ECE1* | Embedded Chip Enable 1 |
| 75 | P0.7 | Port 0 bit 7 |
| 76 | EA10 | Embedded Address line 10 |
| 77 | P0.6 | Port 0 bit 6 |
| 78 | ECE2* | Embedded Chip Enable 2 |
| 79 | P0.5 | Port 0 bit 5 |
| 80 | EA11 | Embedded Address line 11 |

Pin Description (By Pin Function)

The following is a pin description organized by pin function:

| PIN | SIGNAL | DESCRIPTION |
|---|---|---|
| 13,14 | VCC | VCC input from system power supply |
| 52-53 | GND | Ground |
| 47 | XTAL2 | Crystal Input 2 |
| 48 | XTAL1 | Crystal Input 1 |
| 68 | PSEN* | Program Store Enable |
| 70 | ALE | Address Latch Enable |
| 73 | EA* | External Access Enable |
| 34 | RST | Reset |
| 75 | P0.7 | Port 0 bit 7 |
| 77 | P0.6 | Port 0 bit 6 |
| 79 | P0.5 | Port 0 bit 5 |
| 1 | P0.4 | Port 0 bit 4 |
| 5 | P0.3 | Port 0 bit 3 |
| 7 | P0.2 | Port 0 bit 2 |
| 9 | P0.1 | Port 0 bit 1 |
| 11 | P0.0 | Port 0 bit 0 |
| 31 | P1.7 | Port 1 bit 7 |
| 29 | P1.6 | Port 1 bit 6 |
| 27 | P1.5 | Port 1 bit 5 |
| 25 | P1.4 | Port 1 bit 4 |

-continued

| PIN | SIGNAL | DESCRIPTION |
|---|---|---|
| 21 | P1.3 | Port 1 bit 3 |
| 19 | P1.2 | Port 1 bit 2 |
| 17 | P1.1 | Port 1 bit 1 |
| 15 | P1.0 | Port 1 bit 0 |
| 66 | P2.7 | Port 2 bit 7 |
| 64 | P2.6 | Port 2 bit 6 |
| 60 | P2.5 | Port 2 bit 5 |
| 58 | P2.4 | Port 2 bit 4 |
| 56 | P2.3 | Port 2 bit 3 |
| 51 | P2.2 | Port 2 bit 2 |
| 50 | P2.1 | Port 2 bit 1 |
| 49 | P2.0 | Port 2 bit 0 |
| 46 | P3.7/RD* | Port 3 bit 7/Read Enable |
| 45 | P3.6/WR* | Port 3 bit 6/Write Enable |
| 44 | P3.5/T1 | Port 3 bit 5/Timer Counter Input 1 |
| 41 | P3.4/T0 | Port 3 bit 4/Timer Counter Input 0 |
| 40 | P3.3/INT1* | Port 3 bit 3/External Interrupt Input 1 |
| 39 | P3.2/INT0* | Port 3 bit 2/External Interrupt Input 0 |
| 38 | P3.1/TXD | Port 3 bit 1/Transmit Data Output |
| 36 | P3.0/RXD | Port 3 bit 0/Receive Data Input |
| 12 | VCCO | VCC output to CMOS static RAM VCC pin |
| 54 | VLI | Lithium Voltage Unput |
| 16 | EA14* | Embedded Address line 14 |
| 8 | EA13* | Embedded Address line 13 |
| 18 | EA12 | Embedded Address line 12 |
| 80 | EA11 | Embedded Address line 11 |
| 76 | EA10 | Embedded Address line 10 |
| 4 | EA9 | Embedded Address line 9 |
| 6 | EA8 | Embedded Address line 8 |
| 20 | EA7 | Embedded Address line 7 |
| 24 | EA6 | Embedded Address line 6 |
| 26 | EA5 | Embedded Address line 5 |
| 28 | EA4 | Embedded Address line 4 |
| 30 | EA3 | Embedded Address line 3 |
| 33 | EA2 | Embedded Address line 2 |
| 35 | EA1 | Embedded Address line 1 |
| 37 | EA0 | Embedded Address line 0 |
| 71 | ED7 | Embedded Data line 7 |
| 69 | ED6 | Embedded Data line 6 |
| 67 | ED5 | Embedded Data line 5 |
| 65 | ED4 | Embedded Data line 4 |
| 61 | ED3 | Embedded Data line 3 |
| 59 | ED2 | Embedded Data line 2 |
| 57 | ED1 | Embedded Data line 1 |
| 55 | ED0 | Embedded Data line 0 |
| 74 | ECE1* | Embedded Chip Enable 1 |
| 78 | ECE2* | Embedded Chip Enable 2 |
| 10 | ER/W* | Embedded Bus Read/Write |

The following discussion provides information specifically for use with the DS5000FP. Consult the DS5000 DIP data sheet and users guide for a complete explanation of the DS5000's features and operation.

Embedded Address/Data Bus

Figure 2:
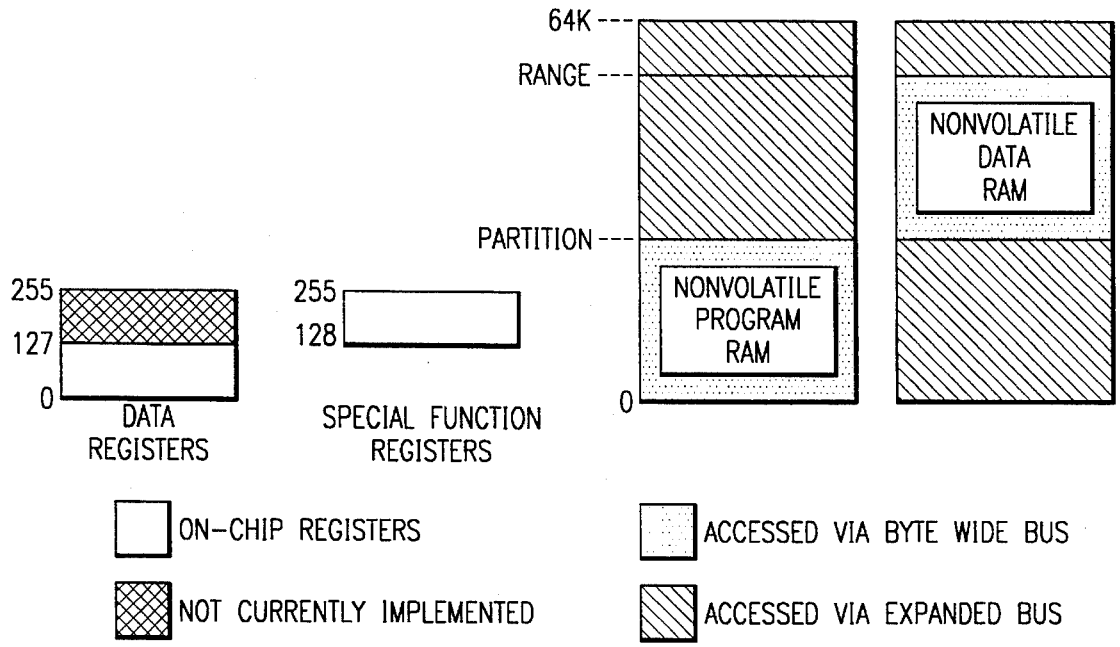
FIG. 2 shows the partitioned memory architecture obtained, in the presently preferred embodiment, when the microprocessor of the presently preferred embodiment is operating in a first mode of memory organization.

The embedded address and data busses are used on the DS5000FP to connect to external byte-wide memory devices. Pins A0–A14 address up to 32 KBytes of Program/Data memory which is transferred over pins ED0–ED7 (a bidirectional port). An additional 32 Kbytes of data memory (cannot be used for program memory) can be addressed by using ECE2* (manipulation of ECE2* is described in the DS5000 data sheet). The ER/W* signal connects to the WE* inputs of the memory devices to indicate a read or write operation. FIG. 1 shows a typical connection using 32K×8 SRAM devices while FIG. 2 shows one with 8K×8 devices.

The ECE1* signal is used to enable a single memory device for program and/or data memory. The address partition between program and data memory is determined by the contents of the MCON register just like in the normal DS5000 DIP. Also the range bit in the MCON register must match the size of the memory attached: either 8 or 32 Kbytes. The timing characteristics of the embedded address/ data bus and its associated control signals (ECE1*, ECE2* and ER/W*) are given at the back of this data sheet.

Memory Selection

When using battery-backed SRAM with the DS5000FP, the most important parameter to be cognizant of is the standby current drain of the SRAM. This parameter together with the capacity of the battery determine the how long data will remain nonvolatile. Typically, larger memory sizes (e.g. 32K× 8) consume more dynamic and standby current; consequently a larger capacity battery may be required for an acceptable data retention lifespan.

Battery Selection

To maintain a data retention lifespan of 10 years or greater, the lithium energy source offers a compact, reliable choice. Typical lithium sources offer 10 years of shelf life and capacities exceeding 200 Ma-hours (mAH). For example, a type CR2330 manganese dioxide 3V lithium battery (260 mAH) when used with a Hitachi HM62256LP-SL can typically provide 14.8 years of continuous data retention at 25 degrees C. The calculation which should be used is shown below and can be used to estimate data retention lifespans with different memory/battery combinations:

```
Data retention = (battery capacity in mAH)/(memory standby
                 current + 75 nA)(24 hours)(365 days/year)
              = (260mAH)/(0.002 mA typical)(24)(365)
              = 14.8 years typical.
```

The 75 nA figure refers to the maximum internal leakage current of the DS5000FP when it is operating in the data retention mode (Vcc is absent). Type CR batteries are highly recommended because their voltage variability under load is very stable. This is important because the battery voltage is used to define the trip point at which the DS5000FP enters the data retention mode (when the battery is switched in to power the SRAM and the internal registers). Some recommended 3 V lithium batteries include: the Panasonic CR1620 (60 mAH; the Panasonic CR2330 (260 mAH); the Sanyo CR1620 (60 mAH); and the Sanyo CR2430 (270 mAH). The cheaper, smaller capacity batteries are listed for applications where the SRAMs are screened to lower standby currents (published SRAM standby currents are usually very conservative).

If battery voltages other than 3 V are used, it should be noted that most CMOS SRAMs are guaranteed to retain data only to 2 V. The internal voltage drop from the VLI input (pin 36) to VCCO (pin 1) is typically 0.5 V which means that a 3 V battery will cause an actual 2.5 volts to appear at VCCO, resulting in a 0.5 V margin. VCCO would be connected to the VCC input(s) of the connected SRAM(s). Lower battery voltages than 3 V will of course result in less margin.

Power Management

The trip points that use the battery voltage at VLI as a reference are VPFW, VCCMIN and VLI. VPFW (Power Fail Warning) is the voltage threshold for VCC which causes the PCON.5 bit to be set. In addition, a Power Fail Warning interrupt will be generated if so enabled by the EPFW bit (PCON.3). Full processor operation continues at this point. However, if VCC dips below VCCMIN, ECE1*, ECE2* and EA14* go high to protect the external RAM contents. (EA14* stays high for use with 8K×8 RAMs). The processor is shut down and all other pins are three-stated. The VCC source still powers all circuitry at this time. When VCC dips further to below VLI, the battery source present at VLI will begin to supply current to the DS5000 and to devices powered from the VCCO output. ECE1*, ECE*2 and EA14 remain high, although high at whatever VCCO is at (which typically is VLI—0.5 V). Consult the DS5000 USERs GUIDE for further details about the power management features.

In the DS5000 DIP spec, absolute numbers are given for the VPFW, VCCMIN and VLI since the battery used is internal and not a variable determined by the user. In the DS5000FP however, the battery used is a variable and affects the trip points accordingly. To determine the resultant trip points for a given battery voltage, use the following equations (VLI refers to the actual battery voltage):

VPFW=1.45×VLI

VCCMIN=1.40×VLI

VLI(trip)=1.00×VLI

Encrypton Notes

The resident encryptor of the DS5000FP operates identically as in the DIP version. When encryption is enabled by loading the encryption key registers with a 40-bit key, the DS5000FP will encrypt both data and addresses using this key value as a seed. Encryption only operates on program/data memory controlled by ECE1*; data memory controlled by ECE2* will not be encrypted.

DS5001 and DS5001FP

As with the DS5000, the DS5001 is available in both a DIP module version and a flat-pack module. The DS5001FP 128K Micro Chip is an enhanced version of the DS5000FP Micro Chip, which is described in very great detail in the DS5000 Soft Microcontroller user's guide. The DS5001FP is designed for systems with large nonvolatile SRAM and I/O requirements; its separate bytewide address/data bus accesses up to 128K bytes of nonvolatile SRAM for program/data storage. In addition, four peripheral enables allow additional I/O devices to be memory-mapped onto the bytewide bus without the need for external logic. Thus, even in the most complex systems, the 8051-compatible ports are free for general-purpose I/O. When combined with an appropriate external lithium energy cell, the DS5001FP's crash-proof circuitry retains programs and data in external SRAM for 10 years in the absence of VCC.

Compared to its predecessor, the DS5000 Soft Microcontroller, the DS5001FP incorporates memory capacity and flexibility enhancements, additional I/O resources, and new software loading features. Memory improvements include the ability to address 128K bytes of NV SRAM on the bytewide bus, multiple memory architectures for optimum implementation, and a peripheral memory map. Substantial flexibility in memory selection is provided by the DS5001FP's unique architecture, which allows the most cost-effective memory selection to be used.

I/O flexibility is provided by the Reprogrammable Peripheral Controller (RPC). This is an 8042 hardware emulation mode that allows the DS5001FP to act as a slaved peripheral controller for PC bus applications. When the RPC is not in use, port I/O which is fully compatible with the 80C51 remains available. Additional I/O flexibility results from the ability to address external peripheral devices on the bytewide bus, which allows the ports to be used for other functions. If desired, ports 0 and 2 can be configured for bus access similar to the 8051.

The DS5001FP supervises program loading via an internal bootstrap loader ROM. This loader allows the entire RAM memory space and certain configuration registers to be initialized from a PC via a com port. The bootstrap loader is transparent to the execution of application software. Alternatively, bootstrap loading can be performed via the parallel RPC bus. In this way, a system host such as an 8088 CPU can download application software over a PC bus.

The DS5002FP Secure Micro Chip offers the features of the DS5001FP together with software security features which have been greatly enhanced over the DS5000. Consult the DS5002FP data sheet for information on this device.

Some of the distinguishing features of this sample embodiment (not all of which are claimed to be novel nor necessary to the use of any of the claimed inventions) include the following:

Enhanced CMOS microcontroller addresses up to 128K of NV SRAM for program/data

Bytewide address/data bus leaves port pins for general-purpose I/O

Multiple chip select outputs for memory-mapping of peripheral devices

Crashproof circuitry converts CMOS SRAM into non-volatile storage

Reprogrammable Peripheral Controller (RPC) mode emulates 8042 for PC bus applications Increased flexibility in program loading Optional CRC-16 check of NV program/data RAM area on power-up or watchdog reset Bandgap reference provides tight power supply monitoring 100% compatible with 8051 instruction set 80-pin Quad Flat Pack (QFP) surface mount package Pin Description (\ Denotes Condition Low)

| SIGNAL | I/O | DESCRIPTION |
|---|---|---|
| VCC | I | Primary VCC input from power supply. |
| VLI | I | Lithium Voltage Input. |
| GND | I | Ground. |
| PF\ | O | Indicates that VCC has dropped below the battery voltage. |
| VCCO | O | Voltage Output to CMOS SRAM VCC pin. |
| VRST\ | I/O | Indicates that VCC has dropped below the reset threshold. Also forces a power-fail reset when pulled low externally. |
| CE1–4\ | O | SRAM Chip Enables, lithium backed. Used with bytewide address/data bus to access bytewide memory. |
| CE1N\ | O | Chip Enable 1. Non-lithium-backed signal equivalent to CE1\for use with an EPROM. |
| PE1–2\ | O | Peripheral Enables, lithium backed. |
| PE3–4\ | O | Peripheral Enables, non-lithium backed chip enables which access memory-mapped peripheral devices on the bytewide bus. Available when PES bit in the MCON register is set. |
| R/W\ | I/O | Write enable for bytewide bus access. |
| BA15 | O | Bytewide address bus MSB. Used to monitor complete bus address, but not connected to memories. |
| BA14-0 | O | Bytewide address bus. 15-bit bus is connected to NV SRAM and peripheral devices using PE1–4\. |
| BD7-0 | I/O | Bytewide data bus connected to NV SRAM and peripheral devices. |
| PROG\ | I | Invokes bootstrap loading on a falling edge. |
| RST | I | Reset input. |
| XTAL2 | I | Crystal 2 Input. |
| XTAL1 | I | Crystal 1 Input. |
| PSEN\ | O | Program Store Enable. |
| ALE | O | Address Latch Enable. |
| P0.0–0.7 | I/O | General purpose Port 0 bits 0–7; multiplexed expanded address/data bus/AD0–7 and RPC mode data bits 0–7. This is an 8051 compatible 8-bit port. In RPC mode, this bus is a optional 8042 compatible hardware interface. |
| P1.0–1.7 | I/O | General purpose Port 1 bits 0–7. |
| P2.0–2.7,A8–15 | (I/O) | General purpose Port 2 or Expanded address bus. Port 2 can also function as RPC control signals as follows: |
| P2.0(AO) | I | Data/Status select input. |
| P2.1(CE\) | I | RPC mode chip select input. |
| P2.2(RD\) | I | RPC mode read enable. |
| P2.3(WR\) | I | RPC mode write enable input. |
| P2.4(OBF) | O | RPC mode output buffer full. |
| P2.5(IBF\) | O | RPC mode input buffer full. |
| P2.6(DRQ) | O | RPC mode request for DMA. |
| P2.7(DACK\) | I | RPC mode DMA acknowledge input. |
| P3.0/RXD | I/O | General purpose Port 3 bit 0 and serial port receive data input. |
| P3.1/TXD | I/O | General purpose Port 3 bit 1 and serial port transmit data output. |
| P3.2/INT0\ | I/O | General purpose Port 3 bit 2 and external interrupt input 0. |
| P3.3/INT1\ | I/O | General purpose Port 3 bit 3 and external interrupt input 1. |
| P3.4/T0 | I/O | General purpose Port 3 bit 4 and timer counter input 0. |
| P3.5/T1 | I/O | General purpose Port 3 bit 5 and external timer counter |

| SIGNAL | I/O | DESCRIPTION |
|---|---|---|
| | | input 1. |
| P3.5/WR\ | I/O | General purpose Port 3 bit 6 and expanded bus write enable. |
| P3.7/RD\ | I/O | General purpose Port 3 bit 7 and expanded bus read enable. |

The following discussion provides information specifically about the DS5001FP. Consult the Soft Microcontroller User's Guide for a complete explanation of the basic DS5000's features and operation.

Bytewide Address/Data Bus

The bytewide address/data bus is a separate bus structure for accessing off-chip program and data memory. In ordinary 8051-type processors, external program and data fetches use Ports 0 and 2 as a multiplexed address/data bus. In contrast, the DS5001FP provides a non-multiplexed, 15-bit bytewide address bus (pins BA0–BA14), four chip enables, and an 8-bit bytewide data bus (pins BD0–BD7) for interfacing to bytewide memories. Consequently, application software can address up to 64K×8 of program memory and 64K×8 of data memory (128K total) on the bytewide address/data bus, and still use all four ports for general-purpose I/O. In addition, a simple interface for peripheral I/O devices is supported on the bytewide bus for applications which require more I/O functions. Control signals for the bytewide bus consist of R/W\, CE1\–CE4\ and PE1\–PE4\. The R/W\ output is normally connected to WE\ inputs of all devices attached to the bytewide bus in order to indicate a read or write operation. Outputs CE1\–CE4\ are used as chip enables for up to four separate memory devices. Note that CE2\ is no longer limited only to data memory fetches (initiated by MOVX instructions) as on the DS5000FP. Up to four peripheral devices can be accessed by using the software-controlled PE1\– PE4\ chip enable outputs. BA15, which is logically equivalent to the MSB of a 16-bit bytewide address bus, is provided for convenience. This line is unused when addressing memories, as the information is decoded in the chip enables. It is provided to allow a logic analyzer to monitor a 16-bit address field.

Memory Organization

The DS5001FP supports two categories of memory architecture. The first is a partitionable architecture similar to the DS5000FP. This mode is invoked when Partition Mode=0 (PM MCON.1). FIG. 2 shows the memory map that is obtained when PM=0. Up to 64K of nonvolatile program/ data RAM is available in a continuous memory space. The range address specifies the amount of memory addressed on the bytewide bus, and the programmable partition address determines the boundary between nonvolatile program space and data space. Nonvolatile program and data RAM refers to RAM accessed on the bytewide bus. Addresses below the partition are assigned as nonvolatile program RAM. Addresses above the partition and below the range are assigned as nonvolatile data RAM. The range and partition are initialized via the bootstrap loader when the application software is loaded. Table 1 illustrates the partition addresses for a 64K range. If a range of less than 64K (32K, 16K, 8K) is needed, only the relevant partitions should be used. Memory accesses outside the space defined on the bytewide bus, including program memory access above the partition, data memory access below the partition, or any access above the range, are automatically routed to the expanded bus using Ports 0 and 2.

Figure 3:
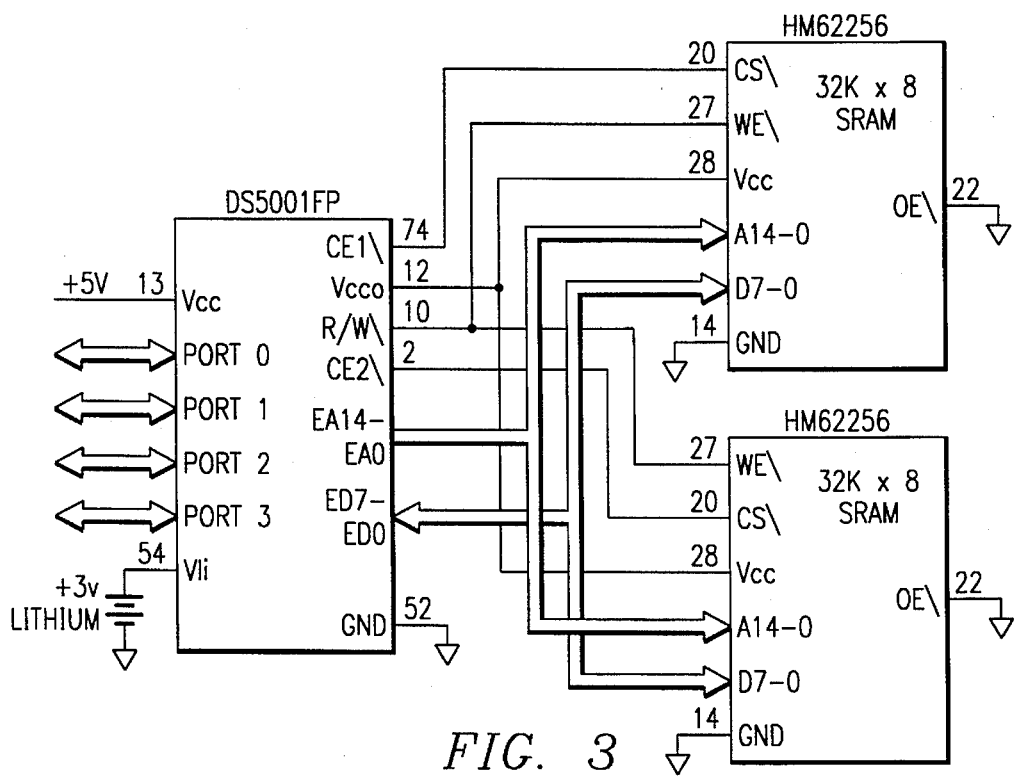
FIG. 3 shows a typical electrical connection used, in this second mode of memory organization, to permit the application software to control the memory partition.

The DS5001FP also supports setting the partition under control of the application software itself (not allowed when the partition is set to 0000H). In this partitionable configuration, CE1\ is tied to the lower RAM and CE2\ is tied to the upper RAM if needed. For any address, the DS5001FP determines which memory to enable depending on the upon the address and the range as shown below. The single memory (range=32K or 8K) configurations will only require CE1\. Memory range is determined by the RG1 and RG0 bits shown below (PM=0). The range control bits reside in the MCON and the RPCTL registers. A typical electrical connection for this configuration is shown in FIG. 3. This figure illustrates a system using 64K SRAM consisting of two 32K devices. Lower addresses are accessed using CE1\ and higher addresses are accessed using CE2\. The address and data bus as well as the WE\ are common. Notice that by using the bytewide bus, no address decoding is required.

TABLE 1

PM=0 RANGE SELECTIONS

| | | | MEMORY ACCESS ADDRESSES | |
|---|---|---|---|---|
| RG1 | RG0 | RANGE | CE1\ | CE2\ |
| 1 | 1 | 64K | 0000–7FFFH | 8000–FFFFH |
| 1 | 0 | 32K | 0000–7FFFH | NA |
| 0 | 1 | 16K | 0000–1FFFH | 2000H–3FFFH |
| 0 | 0 | 8K | 0000–1FFFH | NA |

PM=0 PARTITION SELECTIONS

| PA3 | PA2 | PA1 | PA0 | PARTITION | BYTEWIDE BUS MAP |
|---|---|---|---|---|---|
| 0 | 0 | 0 | 0 | 0000H | 0 K P R O G R A M, DATA=RANGE-0K |
| 0 | 0 | 0 | 1 | 1000H | 4 K P R O G R A M, DATA=RANGE-4K |
| 0 | 0 | 1 | 0 | 2000H | 8 K P R O G R A M, DATA=RANGE-8K |
| 0 | 0 | 1 | 1 | 3000H | 1 2 K P R O G R A M, DATA=RANGE-12K |
| 0 | 1 | 0 | 0 | 4000H | 1 6 K P R O G R A M, DATA=RANGE-16K |
| 0 | 1 | 0 | 1 | 5000H | 2 0 K P R O G R A M, DATA=RANGE-20K |
| 0 | 1 | 1 | 0 | 6000H | 2 4 K P R O G R A M, DATA=RANGE-24K |
| 0 | 1 | 1 | 1 | 7000H | 2 8 K P R O G R A M, DATA=RANGE-28K |
| 1 | 0 | 0 | 0 | 8000H | 3 2 K P R O G R A M, DATA=RANGE-32K |
| 1 | 0 | 0 | 1 | 9000H | 36K PROGRAM, 28K DATA |
| 1 | 0 | 1 | 0 | A000H | 40K PROGRAM, 24K DATA |
| 1 | 0 | 1 | 1 | B000H | 44K PROGRAM, 20K DATA |
| 1 | 1 | 0 | 0 | C000H | 48K PROGRAM, 16K DATA |
| 1 | 1 | 0 | 1 | D000H | 52K PROGRAM, 12K DATA |
| 1 | 1 | 1 | 0 | E000H | 56K PROGRAM, 8K DATA |
| 1 | 1 | 1 | 1 | FFFFH | 64K PROGRAM, 0K DATA |

NOTE: an 8K increment takes place between E000H and FFFFH

A powerful feature for adaptive systems is the ability to reload portions of program memory without stopping execution and entering program load mode. In the partitionable mode, the application software can reload portions of itself by moving the partition to the 4K level. This allows the new application program to be received via the serial port and to be written into RAM using MOVX instructions. When loading is complete, the partition can then be raised to any desired level, converting the new data to program memory. The program kernel that performs this reloading must reside below the 4K boundary.

Figure 4:
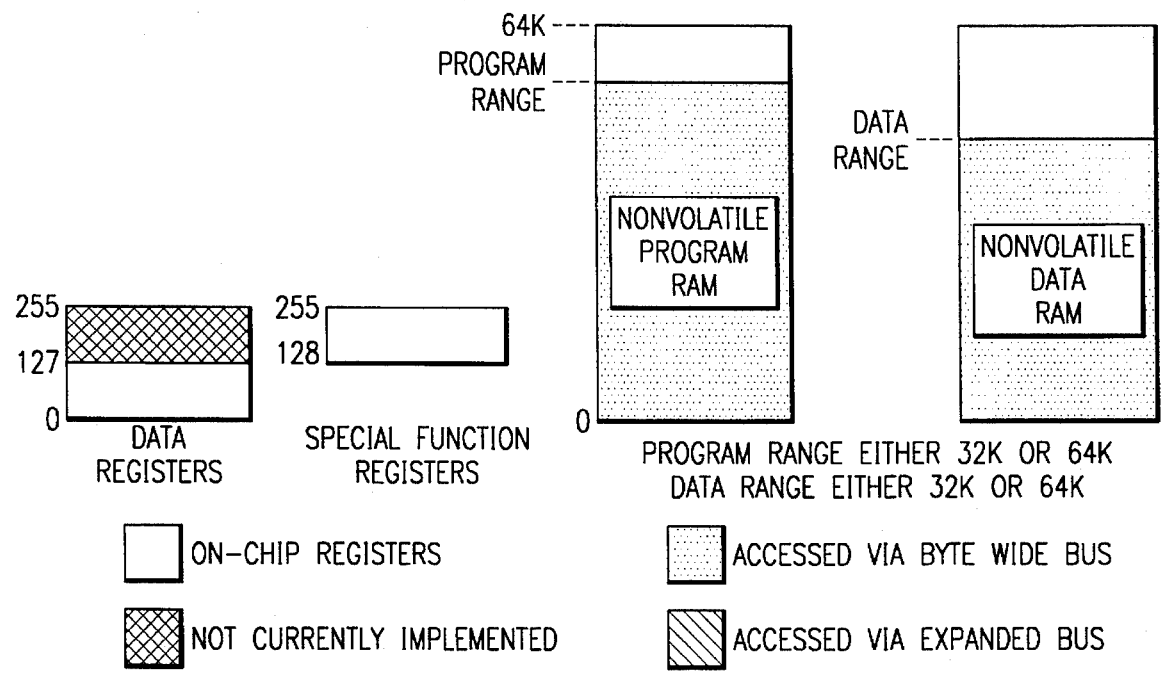
FIG. 4 illustrates the general memory map for a second mode of memory organization, wherein the user can select from four fixed memory choices.
Figure 5:
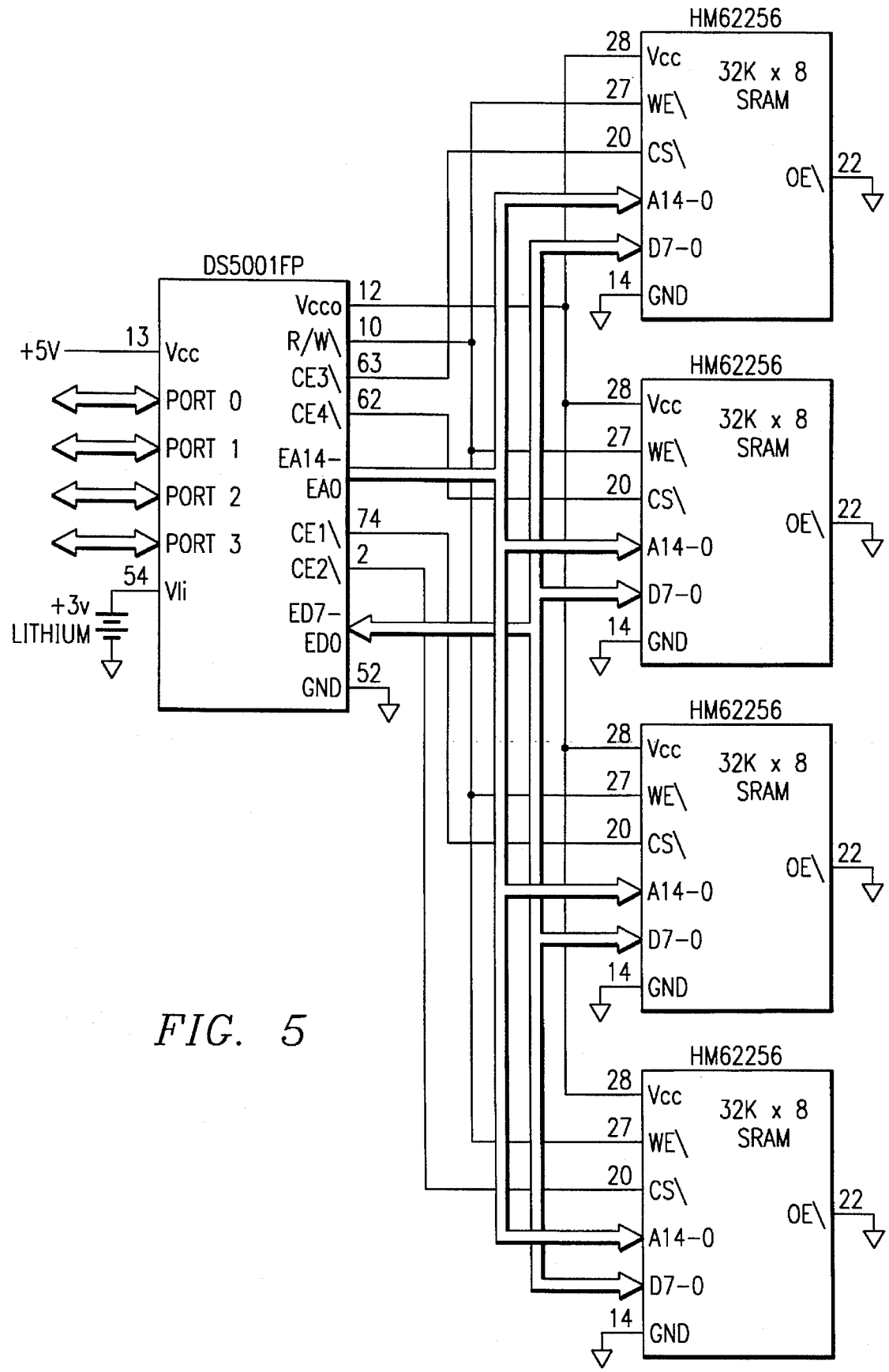
FIG. 5 shows an example of a system using this configuration.

The second memory architecture includes four fixed memory choices. In this configuration, the user can determine which memory configuration provides the most cost-effective microcontroller solution. The configuration is selected by the user during bootstrap loading of the application software, by setting the PM=1 and selecting the range bits as shown below. FIG. 4 illustrates the general memory map for this configuration. Note that the memory space accessed on the bytewide bus is not continuous as when PM=0. Each memory space (program and data) begins at address 0000H. Table 2 describes the configuration bits and chip enable connections for each of four fixed memory allocations. An example of this architecture is shown in FIG. 5. This illustration shows a 128K system using 64K of program and 64K of data memory implemented with 32K SRAMs. CE1\ and CE2\ are used to access program memory, CE3\ and CE4\ to access data memory. The 15-bit address bus and 8-bit data bus are routed to all memories, with a common WE\. This system allows the full addressable space to be used on the bytewide bus, while leaving the ports free for other uses.

TABLE 2

PM=1 MEMORY ARCHITECTURE

| RG1 | RG0 | PROG | DATA | PROGRAM | DATA |
|---|---|---|---|---|---|
| 0 | 0 | 32K | 64K | 1@32K CE\1 | 2@32K CE\3,4 |
| 0 | 1 | 64K | 32K | 2@32K CE\1,2 | 1@32K CE\3 |
| 1 | 0 | 64K | 64K | 2@32K CE\1,2 | 2@32K CE\3,4 |
| 1 | 1 | 64K | 64K | 1@128K × 8 | both program and data |

Figure 6:
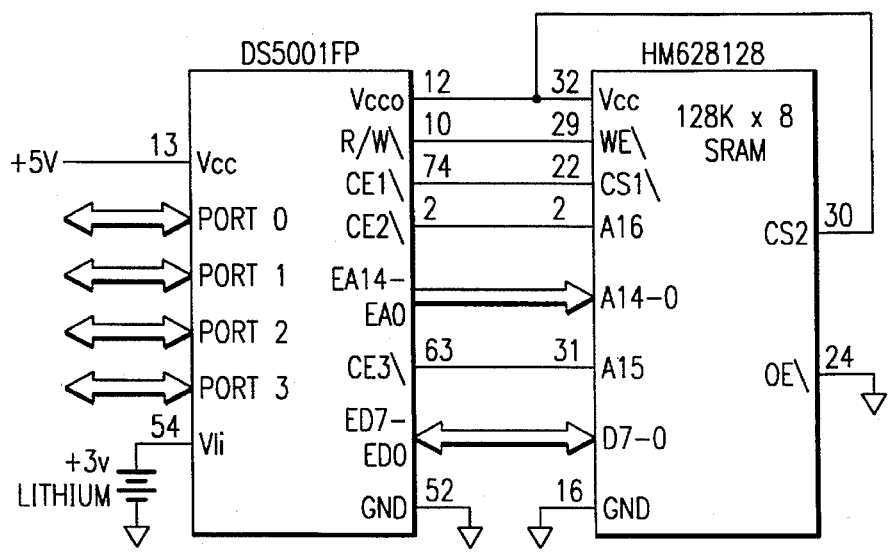
FIG. 6 shows a special memory mode which can be selected for use with a 128K×8 SRAM, in the microprocessor of the presently preferred embodiment.

A special mode is available for using a 128K×8 SRAM as shown above. In this mode, CE1\ is the chip enable and CE2\ is tied to A16. CE2\ is low when program is accessed and high when data is accessed. CE3\ is tied to A15, and CE4\ is unused. This configuration is illustrated in FIG. 6. The settings that invoke this configuration are shown in the last row of Table 2 above.

Portions of program memory can also be reloaded without invoking the bootstrap loader in this non-partitionable configuration. In the partitionable mode, this is accomplished by moving the partition to the 4K level. In the non-partitionable mode (PM=1), a similar feature is available when the Access Enable (AE RPCTL.4) bit is set in the RPCTL register. When AE=1, the DS5001FP will act like a partitionable device with the partition at 4K. The 64K program memory space (less the 4K kernel) may now be written using MOVX instructions. When the loading process is complete, the AE bit should be cleared, restoring the prior memory configuration.

Memory-mapped Peripherals

As illustrated in the above memory maps, the address space of the DS5001FP consists of 3 distinct memory areas: internal on-chip registers (128 bytes of scratchpad registers and 128 bytes of special function registers), nonvolatile program and data RAM accessed on the bytewide bus, and finally, expanded program and data memory (expanded memory is accessed via the 8051-type bus formed by Ports 0 and 2). The expanded bus is accessed automatically when either a program or data address is encountered that is outside the bytewide address configuration, determined by RG1, RG0, and the partition. It is also accessed by a MOVX instruction when the Expanded Bus Select (EXBS RPCTL.5) bit is set, regardless of the configuration. Thus using the EXBS a full 64K data memory space is available on the expanded bus without conflicting with the nonvolatile data RAM on the bytewide bus. The EXBS resides in the RPCTL register. Operation of new and modified registers is discussed on the following page.

Figure 7:
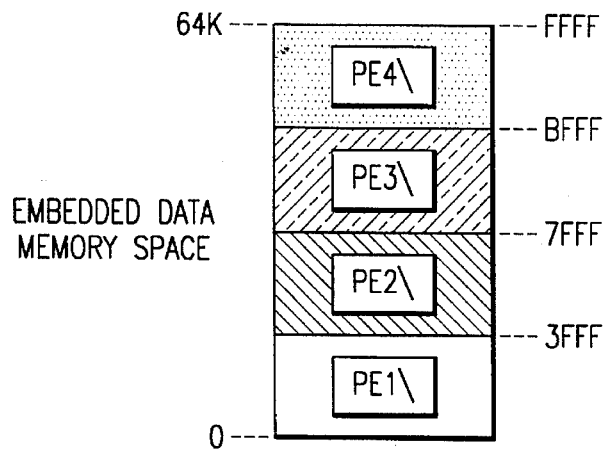
FIG. 7 shows how peripheral enable signals control address space in the data memory map, permitting selection of memory-mapped peripheral I/O devices.

When further memory-mapped I/O is required, an additional 64K data memory space is available on the bytewide bus. One of the new and unique features of the DS5001FP is its ability to select memory-mapped peripheral I/O devices on the bytewide bus. Four peripheral enables, PE\1–4, can be used to address up to four external devices. Each peripheral enable signal controls 16K bytes of address space in the data memory map as illustrated in FIG. 7. PE1\ responds to MOVX instructions for addresses from 0000H to 3FFFH, PE2\ for addresses from 4000H to 7FFFH, etc. To use the peripheral enable signals, the Peripheral Enable Select (PES MCON.2) must be set by the application software. Once set, one of the signals PE1\–PE4\ will transition low when a MOVX instruction uses an address in its allocated block as shown in FIG. 7. Note that the blocks are mutually exclusive so that only one peripheral chip enable is active at any one time. Note also that the chip enables CE1–4\ will not be activated when a MOVX occurs as long as the PES bit is set. Thus the peripheral space does not interfere with the ordinary data memory space. The EXBS function overrides the PES function if both are selected.

Two of the peripheral enable signals, PE1\ and PE2\, are powered by the lithium cell attached to VLI when VCC is removed. Certain peripheral devices, such as the DS1283 Watchdog Timekeeper, as well as most CMOS SRAMs, require that the chip enable input be at the positive supply rail for minimum standby current when in lithium-backed, data retention mode. The other two enables, PE3\ and PE4\, are not lithium-backed and will drop to 0 V whenever the DS5001FP has switched over to the lithium cell for powering VCCO. Therefore, care must be exercised when determining which peripheral device connects to each peripheral enable.

MCON REGISTER (ADDRESS C6H) Bit Description:

MCON.7-4: PA3-0: Partition address. When PM=0, this address specifies the boundary between program and data memory in a continuous space.
    Initialization: Unaffected by watchdog, external, or power-up resets. Set to 1111B on a No VLI reset.
    Read Access: Can be read normally at any time.
    Write Access: Timed Access protected. Also, cannot be written by the application software if set to 0000B by the serial loader. If a 0000B is written via the serial loader and the security lock is set, the Partition will become 1111B. The same will occur if write access is available and application software writes a 0000B.

-continued

MCON REGISTER (ADDRESS C6H) Bit Description:

MCON.3: RG1 One of two bits that determine tha range of program space. RG0 is located in the RPCTL register.
    Initialization: Unaffected by watchdog, external, or power-up resets. Set to 1 on a No VLI reset or a clearing of the security lock.
    Read Access: Can be read at any time.
    Write Access: Cannot be modified by the application software. Can only be written during program load.
MCON.2 PES Peripheral Enable Select. When this bit is set, the data space is controlled by PE1\-PE4\. Peripherals are memory-mapped in 16K blocks, and are accessed by MOVX instructions.
    Initialization: Cleared by all resets.
    Read Access: Can be read at any time.
    Write Access: Can be written at any time.
MCON.1: PM Partition Mode. When PM=0, a partitionable, continuous memory map is invoked, as described is FIG. 2. When PM=1, one of four fixed allocations is used as shown in Table 2.
    Initialization: Unaffected by watchdog, external, or power-up reset. Cleared on a No VLI reset.
    Read Access: Can be at any time.
    Write Access: Cannot be written by the application software. Can only be modified during program load.

Reprogrammable Peripheral Controller (RPC)

The Reprogrammable Peripheral Controller (RPC) mode of the DS5001FP emulates the 8042 slave hardware interface commonly used in IBM-compatible PCs for control of peripherals such as a keyboard or a mouse device. In addition to a direct interface to the PC backplane bus, the DS5001FP brings the advantages of up to 128K of reprogrammable, nonvolatile program and data memory to intelligent peripheral control. The nonvolatile data memory accessed by the DS5001FP can be used for system configuration, hard disk setup parameters, or even maintenance records. System peripheral developers now have the benefit of programming in the standard 8051 instruction set with its more powerful features and wider development support.

In operating as a slave controller, the DS5001FP provides communication with a host processor via three resource registers: Data Bus In (DBBIN), Data Bus Out (DBBOUT), and Status (STATUS). The host may read data or status and write data or commands to DBBIN. The Status register provides information about DBBIN, DBBOUT, and user-defined flags. Both DBBIN and DBBOUT share special function register address 80H with Port 0. The context will determine which register is used. The STATUS is at SFR location 0DAH.

Figure 8:
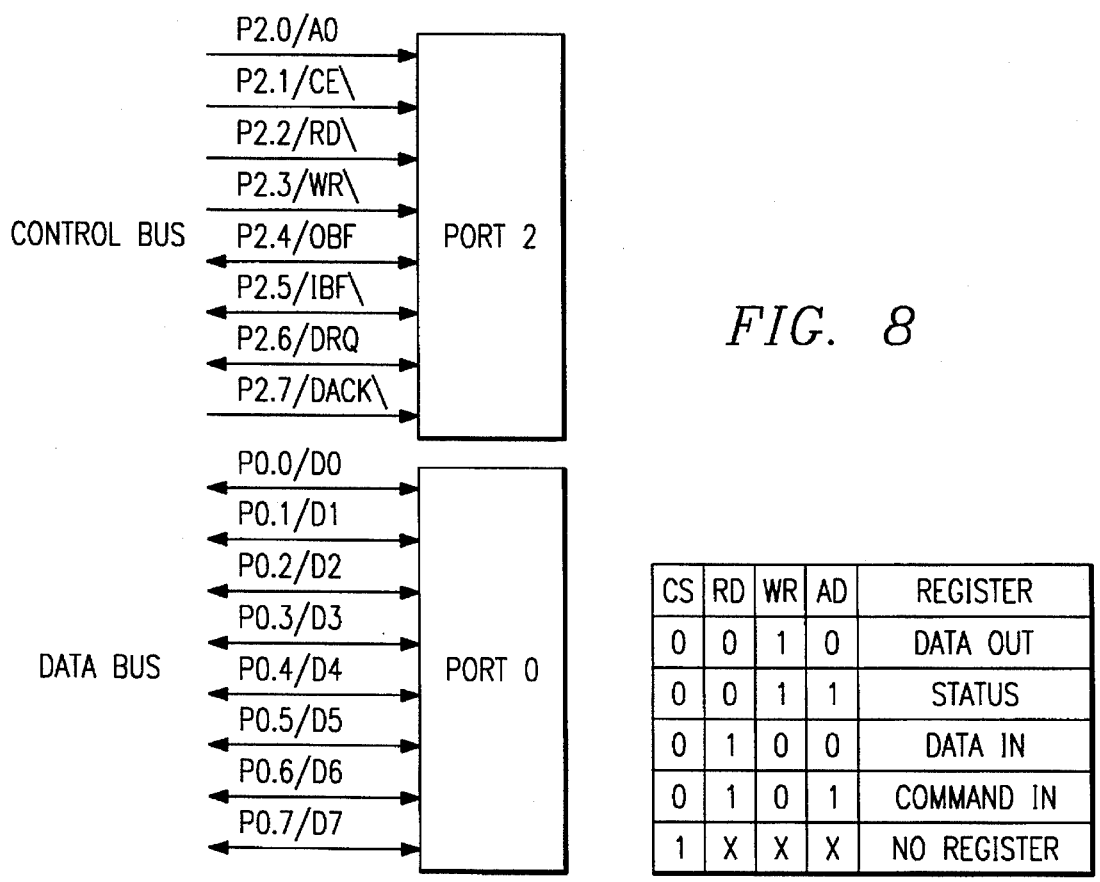
FIG. 8 shows the RPC mode, in which ports are reconfigured to emulate the 8042 hardware interface, in the microprocessor of the presently preferred embodiment.

To enable the RPC mode, the RPCON bit in the RPCTL register (described below) must be set to a 1. At this time, Ports 0 and 2 are reconfigured to emulate the 8042 hardware interface as shown in FIG. 8. Port 0 becomes an 8-bit data bus that can connect directly to a PC data bus. Port 2 provides the control and address information for the data bus. Both ports are true bidirectional I/O devices in this mode. Normal operation of these ports is suspended when RPC mode is enabled. The modified port functions are described as follows:

| | |
|---|---|
| Port 0: D0–7 | This is the 8-bit data bus of the RPC. As a bidirectional I/O bus, it can interface directly to a PC bus or other host. |
| Port 2.0 : A0 | Address input used to determine whether the data bus word is data or command/status. |
| Port 2.1 : CE\ | If a multiple RPC mode environment is required, this input can be used to select an individual DS5001FP on a common bus. |
| Port 2.2 :RD\ | Input that allows the host to read data or status from the DBBOUT or STATUS. |
| Port 2.3 : WR\ | Input that allows the host to write data or commands to DBBIN. |
| Port 2.4 : OBF | Output flag that indicates to a host that the output buffer is full and should be read. |
| Port 2.5 :IBF\ | Output that indicates to a host that the input buffer is empty. |
| Port 2.6 : DRQ | Output that indicates to a host that a DMA is required. |
| Port 2.7:DACK\ | Input that indicates to the DS5001FP that the host has granted a DMA. |

RPC Interrupts

RPC mode provides an additional interrupt to the standard DS5000 set. An Input Buffer Full Interrupt (IBF) will be performed (if enabled) when data is written to the DBBIN from a host. When enabled, this interrupt replaces the Timer 1 interrupt (vector location 1BH). Regardless of whether this interrupt is enabled, future writes are locked out until the DBBIN is read by the DS5001. The DS5001FP provides two outputs to interrupt the host system as needed. These are Output Buffer Full (OBF) and Input Buffer Empty (IBF\).

RPC STATUS REGISTER - RPS (Address 0DAH)

Bit Description:
RPS.7-4: General purpose status bits that can be written by the DS5001FP and can be read by the external host.
    Initialization: Cleared when RPCON=0.
    Read Access: Can be read by DS5001FP and host CPU when RPC

RPC STATUS REGISTER - RPS (Address 0DAH)

mode is invoked.
Write Access: Can be written by the DS5001FP when RPC mode is invoked.

RPS.3: IA0 Stores the value of the external system A0 for the last Input Buffer Write when a valid write occurs (as determined by the IBF flag).
Initialization: Cleared when RPC=0.
Read Access: Can be read by the DS5001FP and host CPU when in RPC mode.
Write Access: Automatically written when a valid Input Buffer Write occurs. Cannot be written otherwise.

PRS.2: F0 General purpose flag written by the DS5001FP and read by the external host.
Initialization: Cleared when RPC=0.
Read Access: Can be read by the DS5001FP and host CPU when in RPC mode.
Write Access: Can be written by the DS5001FP when in RPC mode.

RPS.1: IBF Input Buffer Full Flag is set following a write by the external host, and is cleared following a read of the Input Buffer by the DS5001.
Initialization: Cleared when RPC=0.
Read Access: Can be read by the DS5001FP and host CPU when in RPC mode.
Write Access: Written automatically as part of the RPC communication. Cannot be set by the application software.

RPS.0: OBF Output Buffer Full Flag is set following a write of the output buffer by the DS5001, and is cleared following a read of the Output Buffer by the external host.
Initialization: Cleared when RPC=0.
Read Access: Can be read by the DS5001 and host CPU when in RPC mode.
Write Access: Written automatically as part of the RPC communication. Cannot be set by the application software.

RPC Protocol

Data is written to the DS5001FP and is placed in the Input File Buffer. At this time, the IBF flag is set in the RPC Status Register. If enabled by the IBI bit in the RPCTL register, an IBI interrupt will occur. No further updates of the Input Buffer will be allowed until the buffer is read by the DS5001FP. Once read, the IBF flag will be cleared. When the Output Buffer is written to by the DS5001FP, the OBF is set in the RPC Status Register (RPS). No future writes are allowed until the Output Buffer is read by the external host. The OBF is cleared when such a read takes place.

The RPC mode provides a simple interface to a host processor. In general, four control bits specify the operation to be performed. This works as follows:

| CS\ | A0 | RD\ | WR\ | OPERATION |
|---|---|---|---|---|
| 0 | 0 | 0 | 1 | Read DBBOUT |
| 0 | 1 | 0 | 1 | Read STATUS |
| 0 | 0 | 1 | 0 | Write DBBIN with data |
| 0 | 1 | 1 | 0 | Write DBBIN with command |
| 1 | X | X | X | Disable RPC bus communication |

The above conditions provide the basis of a complete slave interface. The protocol for such communication might operate as follows:

1) Host processor reads STATUS.
2) If DBBIN is empty (IBF=0), host writes a data or command word to DBBIN.
3) If DBBOUT is full (OBF=1), host reads a word from DBBOUT.
4) RPC detects IBF flag via interrupt or polling. Input data or command word is processed.
5) RPC recognizes OBF=0, and writes a new word to DBBOUT.

Figure 9:
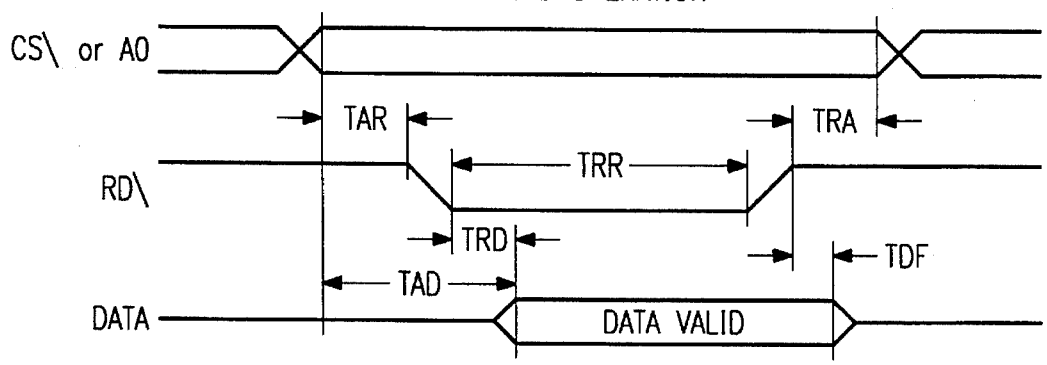
FIG. 9 shows a timing diagram of the RPC mode.
Figure 9:
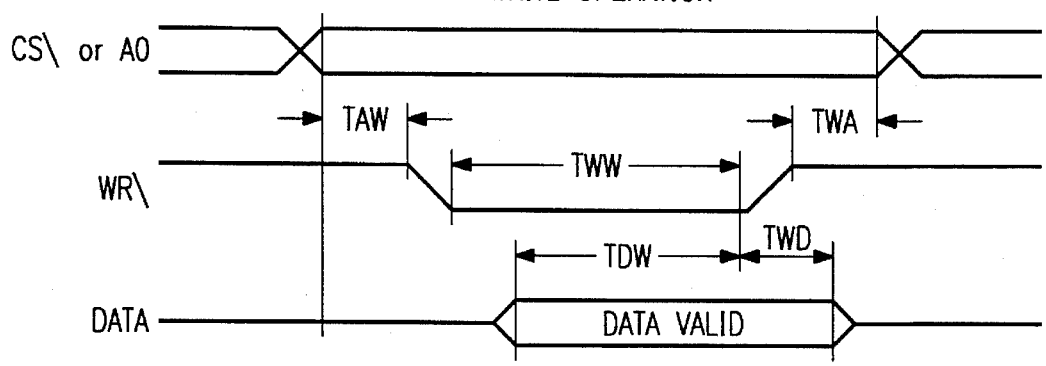
Figure 9:
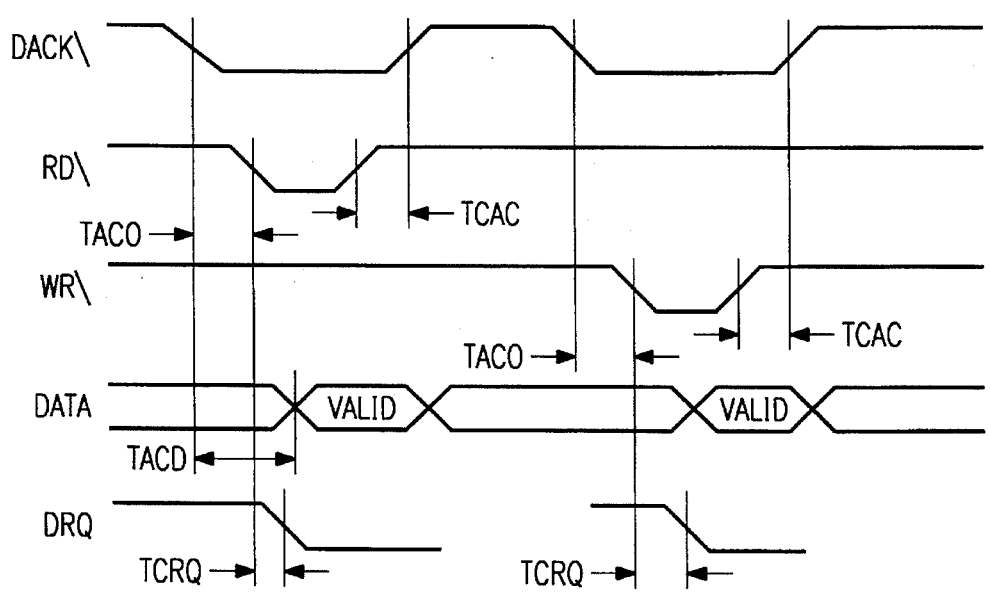

Timing diagrams in FIG. 9 illustrate the operation of the RPC mode bus transfers. A DBBOUT read places the contents of DBBOUT on the data bus and clears OBF. A STATUS read places the contents of the STATUS register on the data bus. A write to DBBIN causes the contents of the data bus to be transferred to the DBBIN, and the IBF flag (STATUS) is set. A command write operates in the same way. The DS5001FP can determine whether the write was data or command by examining the IA0 bit in the STATUS register. This bit will be equal to the A0 input of the most recent host write operation.

DMA Operation

If DMA transfers are required, the DS5001FP RPC mode can support them. DMA transfers are initiated by setting the DMA bit in the RPCTL register. The DRQ output is de-asserted at this time. DRQ can be asserted by writing a 1 to the DRQ line (P2.6) from software. The host CPU must respond by pulling the DACK\ input low. Data can then be transferred according to the user's required protocol. DMA mode can be cancelled by clearing the DMA bit, by a DS5001FP reset, or by clearing the RPC to leave RPC mode.

RPC Control Register—RPCTL (Address 0D8H)

A new register has been added to the special function register space of the DS5001FP. As shown above, the bits have the following functions:

Bit Description:

| | | |
|---|---|---|
| RPCLT.7 | RNR | The random number generator of the DS5001FP is available to the user. When a random number is required, the RNR bit signifies that one is available. This bit is cleared when the random number is read, and approximately |

| | Bit Description: | |
|---|---|---|
| | | 160 usec are required to generate the next number. |
| Initialization: | | Cleared after all resets. |
| Read Access: | | Can be read at any time. |
| Write Access: | | Cannot be written. |
| RPCLT.5 | EXBS | The Expanded Bus Select routes data memory access (MOVX) to the Expanded bus formed by Ports 0 and 2 when set. |
| Initialization: | | Cleared after all resets. |
| Read Access: | | Can be read at any time. |
| Write Access: | | Can be written at any time. |
| RPCTL.4 | AE | Access Enable is used when a software reload is desired without using Program Load mode. When set, the DS5001FP will be temporarily configured in a partitionable configuration with the partition at 4K. This will occur even if the PM = 1. When cleared, the prior memory configuration is resumed. |
| Initialization: | | Cleared after all resets. |
| Read Access: | | Can be read at any time. |
| Write Access: | | Can be written at any time, Timed Access protected. |
| RPCTL.3 | IBI | When using the RPC mode, an interrupt may be required for the Input Buffer Flag. This interrupt is enabled by setting the Input Buffer Interrupt (IBI) bit. At this time, the timer 1 interrupt is disabled, and this RPC mode interrupt is used in its place (vector location 1BH). This bit can be set only when the RPCON bit is set. |
| Initialization: | | Cleared on all resets, and when the RPCON bit is cleared. |
| Read Access: | | Can be read at any time. |
| Write Access: | | Can be written in RPC mode (when the RPC mode is set). |
| RPCTL.2 | DMA | This bit is set to enable DMA transfers when RPC mode is invoked. It can only be set when RPC = 1. |
| Initialization: | | Cleared on all resets and when RPC is cleared. |
| Read Access: | | Can be read anytime. |
| Write Access: | | Can be written when RPCON bit is set. |
| RPCTL.1 | RPCON | Enable the 8042 I/O protocol. When set, Port 0 becomes the data bus, and Port 2 becomes the control signals as shown in FIG. 8. |
| Initialization: | | Cleared on all resets. |
| Read Access: | | Can be read at any time. |
| Write Access: | | Can be written at any time. |
| RPCTL.0 | RG0 | This is a Range bit which is used to determine the size of the program memory space. Its usage is shown above. |
| Initialization: | | Unaffected by watchdog, external, or power-up resets. Cleared on a No VLI reset. |
| Read Access: | | Can be read at any time. |
| Write Access: | | Cannot be modified by the application software. Can only be written during Program Load. |

CRC-16 Software Verification

The DS5001FP provides optional software verification on power-up using the CRC function. Special purpose hardware provides the CRC a 64K memory space in approximately 400 ms. To support this function, the CRC register shown below is accessible through the Bootstrap Loader. The upper nibble of the CRC register (a hex value between 0 and F) defines the address space in 4K blocks over which the CRC calculation is performed. When the LSB of the CRC register is set, the CRC of the specified block is computed and stored in the last two bytes of the specified area. On power-up, the CRC will be performed and checked against these locations. If an error is detected, the DS5001FP will invoke the Bootstrap Loader and wait. Automatic CRC checking on power-up can be disabled by writing a 0 to the LSB. The CRC register can be written using the W command in program load mode. CRC hardware uses registers 0C3H and 0C2H for most and least significant byte intermediate storage. These registers are accessible for a user-performed CRC calculation.

| CRC REGISTER (Address 0C1H) | | |
|---|---|---|
| CRC.7-4: | CRCRANGE 3-0 | Determines the range over which a power-up CRC will be performed. Addresses are specified on 4K boundaries. |
| Initialization: | | Reset to 0 on a No VLI reset. |
| Read Access: | | Can be read at any time. |
| Write Access: | | Cannot be written by application software. Can be written during program load mode. |
| CRC.0: | CRC | When set to 1, a CRC check will be performed on power-up. CRC will be compared to stored values. An error will initiate program load mode. |
| Initialization: | | Reset to 0 on a No VLI reset. |
| Read Access: | | Can be read at any time. |
| Write Access: | | Cannot be written by application software. Can be written during program load mode. |

Bootstrap Loader Enhancements

The Bootstrap Loader can be invoked with a single program pin (PROG\) on the DS5001FP. A falling edge on this pin invokes program load mode directly. In the DS5000, program load was invoked by pulling RST high and PSEN\ low. This method also remains available in the DS5001FP. Once bootstrap loading is invoked, the DS5001FP monitors inputs to determine the appropriate type of interface to the host PC. A serial ASCII carriage return received via the serial port will invoke the Serial Bootstrap Loader, which operates in the same manner as the DS5000. Bootstrap loading is exited by asserting a rising edge on PROG\ or issuing an "E" command to the loader. If program load mode was entered using RST and PSEN\, then the Bootstrap Loader will be exited when this condition is removed.

TABLE 3

| SERIAL BOOTSTRAP LOADER COMMANDS | |
|---|---|
| COMMAND | FUNCTION |
| C | Return CRC-16 of the nonvolatile program/data RAM |
| D | Dump Intel Hex file |
| F | Fill nonvolatile program/data RAM block with constant |
| L | Load Intel Hex file |
| R | Red Status of SFRs (MCON, 5001, PCON, CRC) |
| T | Trace (echo) incoming Intel hex data |
| U | Clear Security Lock |
| V | Verify nonvolatile program/data RAM with incoming Intel Hex data |
| W | Write Special Function Register (MCON, 5001, PCON, CRC) |
| Z | Set Security Lock |
| N | Set Freshness Seal - All program and data will be lost |
| E | Exit Program Load mode and return to application software control |

A new RPC Bootstrap Loader allows a system host such as an 8088 to initiate program loading using the 8042 RPC interface. In this way, the host system can determine a need to update software, then use a standard operating interface to load the application software. No additional hardware is required. The RPC mode is used to load files from a master CPU. A program for peripheral control could be loaded from a floppy or hard disk at boot-up. Software updates can be easily downloaded via diskettes, EPROM, or even over the phone lines using a modem.

Random Number Generator

A true random number generator is incorporated into the DS5001FP. The random byte is based on a true random number generator circuit that uses the asynchronous frequency differences of an internal ring oscillator and the processor master clock (determined by XTAL1 and XTAL2). When a random number is required, the RNR bit must be checked. When a random number is available, this bit will be set. The random byte can be read from a register at location 0CFH. After a byte is read, approximately 160 usec is required to generate another. The RNR will be 0 until this time.

Special Function Register Map

The DS5001FP has several special function registers added or modified. The following table lists the registers and locations. All other registers remain the same as in the DS5000.

TABLE 4

NEW OR MODIFIED SPECIAL FUNCTION REGISTERS

| LABEL | ADDRESS | FUNCTION |
|---|---|---|
| STAT | DAH | RPC STATUS |
| 5001 | D8H | MEMORY AND CONTROL FUNCTIONS |
| RNR | CFH | RANDOM NUMBER BYTE |
| MCON | C6H | MODIFIED MCON REGISTER |
| DBBIN | 80H | RPC DATA IN |
| DBBOUT | 80H | RPC DATA OUT |
| CRC | C1H | CRC FUNCTION CONTROL |
| CRCLOW | C2H | CRC LEAST SIGNIFICANT BYTE |
| CRCHIGH | C3H | CRC MOST SIGNIFICANT BYTE |

Power Supply Monitoring

The DS5001FP incorporates a bandgap voltage reference that allows improved accuracy for power shutdown. In addition, two pins are available that allow the control of external power switching circuits. The VRST\ pin indicates that the power is below the reset threshold, and that consequently the DS5001FP has started orderly power down (Power Down Reset). The PF\ indicates that the power has fallen below the battery voltage and that the DS5001FP has switched to lithium backup for data retention. These pins can be used in conjunction with a power switch such as the DS1336 Afterburner Chip for larger current applications that require battery backup. The VRS\ pin is effectively an active low, bidirectional reset signal. If multiple DS5001FPs are used in a system, this signal can be connected to all devices. In this way, the first DS5001FP that goes into Power Down Reset will pull this signal low, causing the remaining units to enter Power Down Reset. This assures that an operating device is not attempting communication with one that is in Power Down Reset.

Freshness Seal

In certain applications, it is desirable to test an end system, then store it for later programming. Lithium capacity can be preserved in this situation by invoking a freshness seal using the "N" command from the Bootstrap Loader. When this command is issued, the lithium backup will be removed from electrical connection. Upon the subsequent removal of VCC following this operation, data retention will be disabled until the next system power-up. This preserves the lithium cell lifetime while a system is stored.

Applications

Figure 10A:
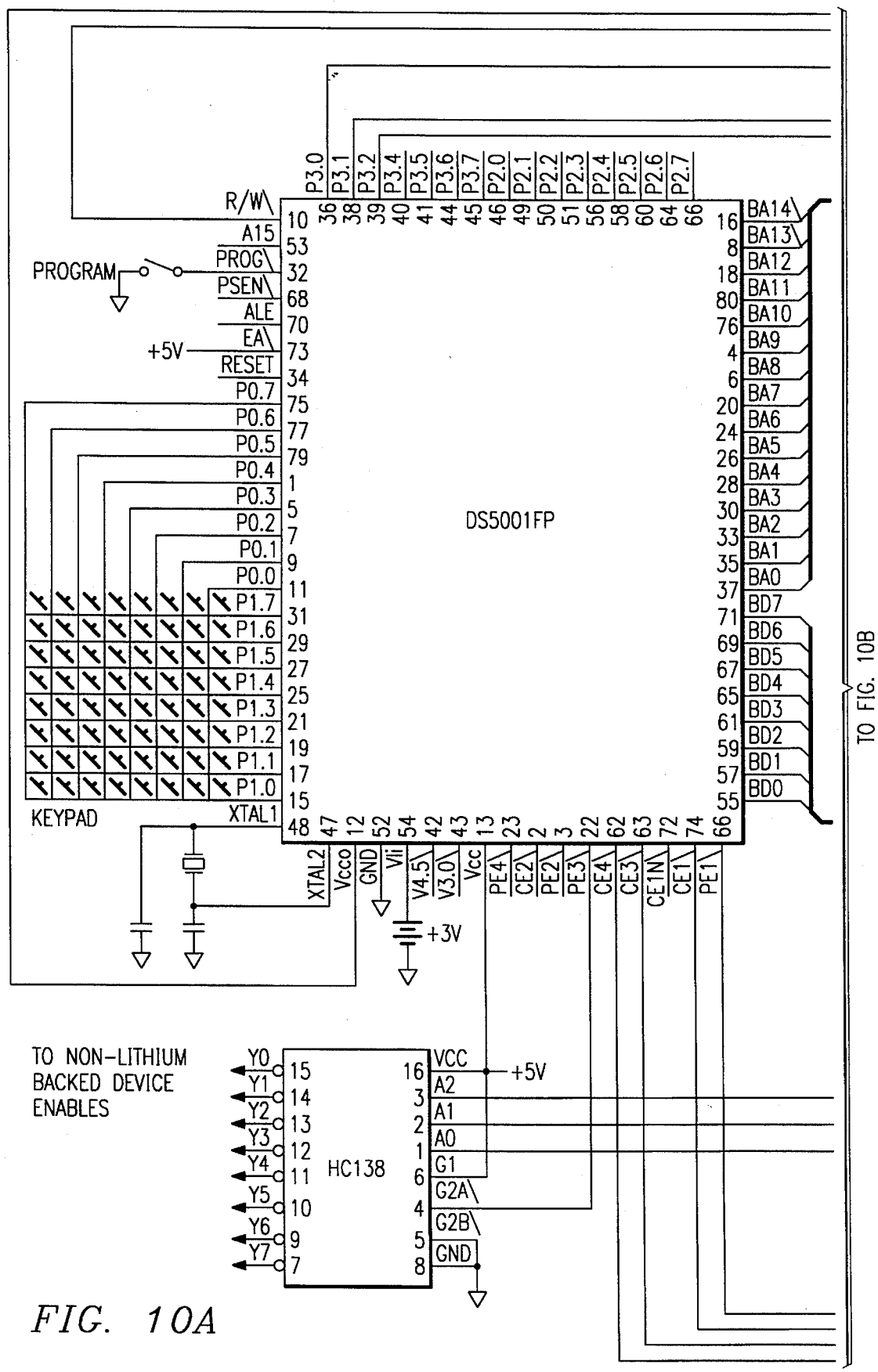
FIG. 10 illustrates a typical application of the microprocessor of the presently preferred embodiment, in a low-power instrument with nonvolatile program and data memory, as well as time-of-day monitoring.
Figure 10B:
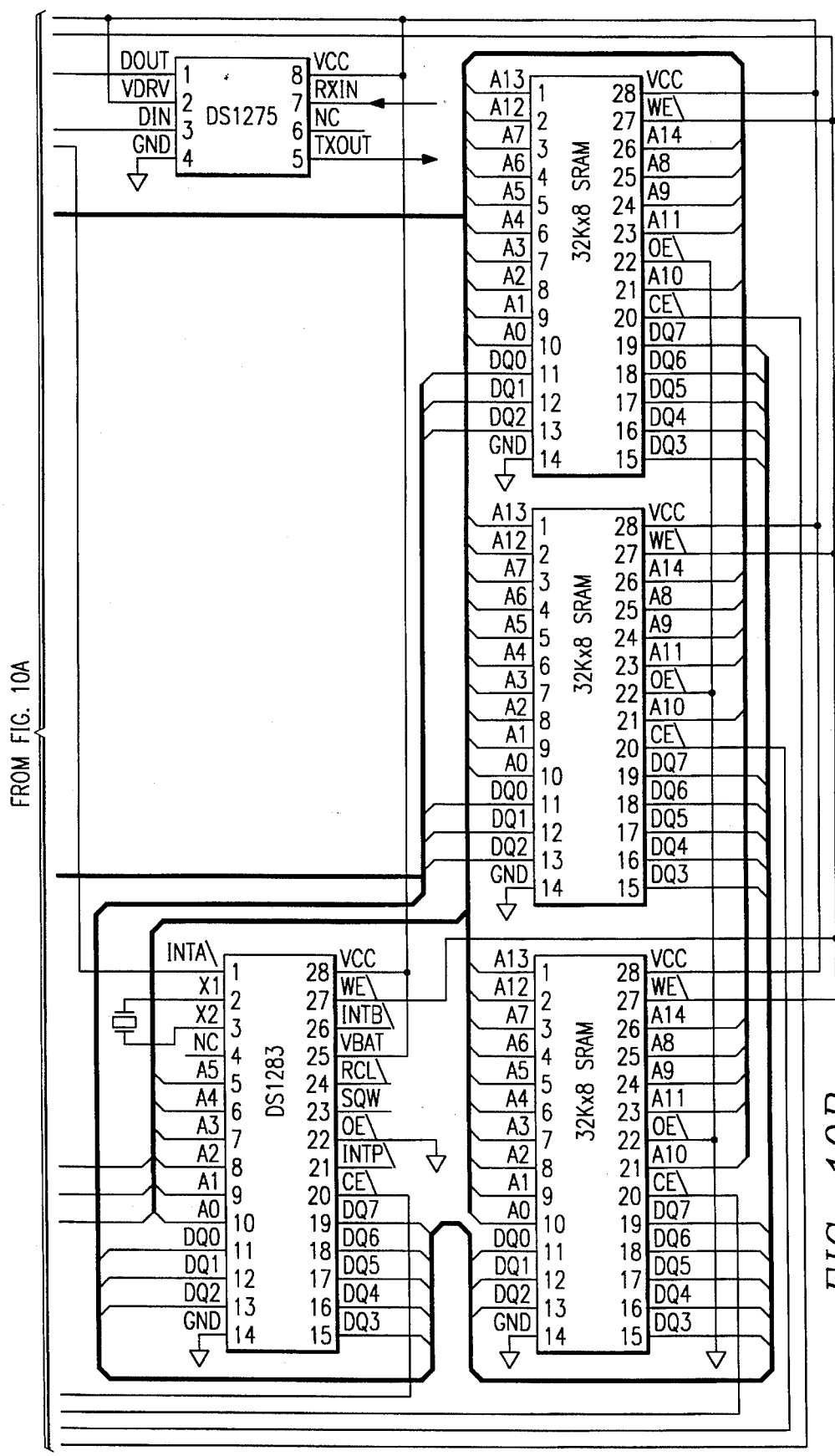

FIG. 10 illustrates a typical application of the DS5001FP. The schematic represents the core of a low-power instrument with nonvolatile program and data memory, as well as time-of-day monitoring. A clock\calendar alarm is provided to notify the DS5001FP that a particular time has occurred. This schematic illustrates a flexible memory architecture by providing 32K of program and 64K of data memory. RAM contents and time of day are preserved in the absence of VCC for over 10 years by the DS5001's crashproof circuitry and backup lithium cell.

The memory architecture and bytewide bus allow most core functions to be memory-mapped, freeing up the ports for other I/O functions. Nonvolatile resources as well as ordinary volatile peripherals can be attached to the bytewide bus. In this example, program and data memory, timekeeping, and other volatile peripherals are memory-mapped. Port pins are used for RS232 communication, an RTC alarm interrupt, and a 64-button keypad. As shown, 13 port pins are still available for alternate uses such as an LCD display.

DS5001FP Enhancements Summary

As shown above, the MCON register on the DS5001FP has been modified from its original function on the DS5000FP. These modifications allow increased flexibility in the type and number of memories used on the bytewide bus. The old PAA bit (MCON.1) has been replaced by the new Partition Mode bit (PM) which determines how the PA3–0 bits map program and data memory. If PM=0, then the PA3–0 select partition addresses that are in 4K×8 steps; if PM=1, then partitioning of a single memory device is prohibited. Instead, the Range determines the size of program and data memory used on the bytewide bus: 32K or 64K bytes. When PM=1, nonvolatile data memory occupies a separate memory map from the nonvolatile program memory. Thus, nonvolatile data memory begins at 0000H (except for the 128K×8 RAM), as opposed to beginning at the partition address when PM=0. Note that the partition bits PA3–0 are timed access protected in the DS5001, as opposed to the PAA bit in the DS5000.

| DS5001FP | DS5000FP |
|---|---|
| 128K Memory Range | 64K total memory, 32K restricted to data only |
| 64K partitionable memory | 32K partitionable memory |
| Peripheral Enables | No extra chip enables, embedded bus consumed completely |
| RPC mode | NA |
| Bandgap Reference | Battery reference (fluctuates) |
| EXBS Expanded Bus | Expanded bus access outside of embedded memory area only |
| Serial or RPC Bootstrap loading | Serial Bootstrap loading |
| Random number generator | NA |
| Automatic CRC on power-up | CRC via Bootstrap Loader only |
| Power monitor signals | NA |

DS5002

The DS5002 is a modified microcontroller, with many features in common with the DS5000 and DS5001, which also has enhanced security features, including: Stronger address/data encryptor; 64-bit encryption key word; Automatic true random key generation; SDI (Self-Destruct Input); Top coating defeats microprobe attack; Customer-specific encryption versions available. This microcontroller incorporates enhanced memory and I/O features of DS5001FP 128K Micro Chip, and is 100% compatible with 8051 instruction set. The presently preferred embodiment uses an 80-pin Quad Flat Pack (QFP) surface-mount package.

The DS5002FP Secure Micro Chip is a secure version of the DS5001FP 128K Micro Chip. In addition to the memory and I/O enhancements of the DS5001FP, the Secure Micro Chip incorporates the most sophisticated security features available in any microcontroller. The security features of the DS5002FP include an array of mechanisms which are designed to resist all levels of threat, including observation, analysis, and physical attack. As a result, a massive effort would be required to obtain any information about memory contents. Furthermore, the soft nature of the DS5002FP allows frequent modification of the secure information, thereby minimizing the value of any secure information obtained at any given time by such a massive effort.

The DS5002FP implements a security system that is an improved version of its predecessor, the DS5000 Soft Microcontroller. Like the DS5000, the DS5002FP loads and executes application software in encrypted form in up to 128K×8 bytes of standard SRAM on its bytewide bus. This RAM is converted by the DS5002FP into lithium-backed nonvolatile storage for programs and data. As a result, the contents of the RAM and the execution of the software appear unintelligible to the outside observer. The encryption algorithm uses an internally stored and protected key. Any attempt to discover the key value results in its erasure, rendering the encrypted contents of the RAM useless.

The Secure Micro Chip offers a number of major enhancements to the software security implemented in the previous generation of the DS5000 Soft Microcontroller. First, the DS5002FP provides a stronger software encryption algorithm which incorporates elements of DES encryption. Second, the encryption is based on a 64-bit key word, as compared to the DS5000's 40-bit key. Third, the key can only be loaded from an on-chip true random number generator. As a result, the true key value is never known by the user. Fourth, a Self-Destruct Input pin (SDI) is provided to interface to external tamper detection circuitry. With or without the presence of VCC, activation of the SDI pin has the same effect as resetting the security lock: immediate erasure of the key word and the 48-byte vector RAM area. Fifth, a special top-coating of the die prevents access of information using microprobing techniques. Finally, customer-specific versions of the DS5002FP are available that incorporate a one-of-a-kind encryption algorithm.

When implemented as a part of a secure system design, the DS5002FP can typically provide a level of security which requires more time and resources to defeat than it is worth to unauthorized individuals who have reason to try.

DS5004

The DS5004FP is the emulator bond-out version of the DS5001FP. However, the DS5004FP also incorporates the ability to emulate the DS5000FP, a previous generation device. The DS5004FP incorporates all of the DS5001FP features which are realistically useful in an emulator. Such features as battery backup are excluded in favor of emulator specific functions. In addition, the DS5004FP provides access to internal features of the DS5001FP which are used by the ROM based serial loader program, but not available to the user. The DS5004FP has access to these features during a breakpoint. Since these features are transparent to the user, this is the only source of documentation concerning these resources. The primary purpose of this specification is to highlight the resources which are not documented in the user device data sheets or available in the standard products.

ROM Program

All DS5000 family products incorporate a ROM based program which is enabled by entering program load mode. This program allows Intel Hex files to be loaded and dumped, resource registers to be read and written, and memory integrity to be checked using CRC-16. The ROM program has access to registers and control bits which are not documented for the user product version, but which are available to the emulator version. These registers are discussed below. The remaining sections deal with the bond out version (DS5004FP) and make reference to the user device only to highlight features which features are normally unavailable.

DS5004FP Pinout

The DS5004FP incorporates the same pinout as the DS5001FP with the following changes:

| PIN NUMBER | DS5004FP | | DS5001FP | |
|---|---|---|---|---|
| | NAME | FUNCTION | NAME | FUNCTION |
| 12 | EA\ | EXTERNAL ACCESS | VCCO | SWITCHED SUPPLY |
| 14 | OWI | ONE WIRE INTERFACE | NC | NO CONNECT |
| 43 | A5I | BREAKPOINT INDICATOR | V3.0 | VOLTAGE MONITOR |
| 54 | DATA\ | MOVX INDICATOR | VLI | LITHIUM INPUT |
| 72 | PSEL | PROCESSOR SELECT | CE1N\ | CHIP ENABLE 1 N |
| 73 | HWBP | HARDWARE BREAKPOINT | NC | NO CONNECT |

Pin Description

The OWI One Wire Interface implements an output port pin. This pin is available for displaying the results of a monitor without interfering with the 8051 footprint.

EA\ is only available when emulating the DS5000, as this line does not exist in the DS5001FP.

The A5I indicates that a breakpoint is in progress. This signal will remain high until a return from the breakpoint service routine is performed. This signal may be used in handshaking fashion with HWBP to execute a known number of single steps.

PROG/DATA\ indicates that a MOVX operation is occurring by pulsing low during the MOVX.

PSEL is a processor select. The DS5004FP will emulate a DS5001FP when this pin is high. When low, the DS5004FP will emulate a DS5000FP. This pin should only be changed when the power is off.

HWBP is a hardware breakpoint input. When asserted high, the DS5004FP will vector to location 2BH for a breakpoint service routine. The HWBP must be high for at least one oscillator cycle, but may be held high for up to two machine cycles. If this pin is high when the execution of the breakpoint LJMP is complete, a second HWBP will be recorded. This will result in a new breakpoint when the current breakpoint service routine is complete and the next instruction has been finished. Single step operation is achieved by holding this line high continuously.

Register Map

The complete register map for DS5004FP special functions is listed below. Several modified or extra special function registers are incorporated into the DS5004FP. The majority of these are documented in the other product data sheets. Functions which are unique to emulation, or which are only available to the ROM program are documented below.

| ADDRESS | REGISTER NAME | FUNCTION |
|---|---|---|
| 80H | PORT 0 | PORT I/O |
| 81H | SP | STACK POINTER |
| 82H | DPL | DATA POINTER LOW |
| 83H | DPH | DATA POINTER HIGH |
| 87H | PCON | POWER CONTROL |
| 88H | TCON | TIMER CONTROL |
| 89H | TMOD | TIMER MODE |
| 8AH | TL0 | TIMER 0 LOW |
| 8BH | TL1 | TIMER 1 LOW |
| 8CH | TH0 | TIMER O HIGH |
| 8DH | TH1 | TIMER 1 HIGH |
| 90H | P1 | PORT I/O |
| 98H | SCON | SERIAL CONTROL |
| 99H | SBUF | SERIAL I/O |
| A0H | P2 | PORT I/O |
| A8H | IE | INTERRUPT ENABLE |
| B0H | P3 | PORT 1.0 |
| B8H | IP | INTERRUPT PRIORITY |
| C0H | BP | BREAKPOINT REGISTER |
| C1H | CRC | CRC FUNCTION CONTROL |
| C2H | CSCLOW | CRC LSB |
| C3H | CRCHIGH | CRC MSB |
| C4H | BPALSB | BRKPOINT ADDRESS LSB |
| C5H | BPAMSB | BRKPOINT ADDRESS MSB |
| C6H | MCON | MEMORY CONTROL |
| C7H | TA | TIMED ACCESS PROTECT |
| CFH | RNR | RANDOM NUMBER BYTE |
| D0H | PSW | PROGRAM STATUS WORD |
| D8H | 5001 | DS5001 FUNCTIONS |
| D9H | ROMSTAT | ROM CONTROL BITS |
| DAH | STAT | 8042 MODE STATUS |
| DBH | ESLSB | EMULATION STACK LSB |
| DCH | ESMSB | EMULATION STACK MSB |
| DDH | EDA | EMULATION DATA A |
| DEH | EDB | EMULATION DATA B |
| E0H | A | ACCUMULATOR |
| F0H | B | REGISTER |

Register Description

PCON (87H): PCON.5 PFW. The power fail warning is normally used to indicate an impending power failure, allowing the processor to save critical data in nonvolatile storage. Since the DS5004FP does not incorporate this feature, the PFW bit can simulate it. When a breakpoint is active, this bit may be set (it is normally read only). Setting this bit will cause a simulated power fail warning interrupt when the breakpoint is complete. This bit is cleared when read.

BP (C0H) BREAKPOINT REGISTER: The Breakpoint Register consists of control and status bits related to the breakpoint feature of the DS5004FP. The register is constructed as follows:

| 7 | 6 | 5 | 4 | 3 | 2 | 1 | 0 |
|---|---|---|---|---|---|---|---|
| HWBP | C501 | A5I | TE | OWI | BPAE | — | — |

BP.7 HWBP. Status bit which indicates that the current breakpoint was initiated by the HWBP pin.

BP.6 C501. This read only bit indicates the emulation mode. When high, the DS5004FP is emulating the DS5001FP. When low, the DS5004FP is emulating a DS5000FP.

BP.5 A5I. Status pin which indicates that a breakpoint is in progress.

BP.4 TE. Control bit which enables timers during a breakpoint.

BP.3 OWI. The OWI is a one-wire interface. It may be used to implement a debugger interface, freeing the serial port for use by the target system. A half-duplex communication scheme may be implemented, but must be software driven. A single bit is used for I/O access, so that a software driven serial-parallel shift scheme will be necessary to use this feature.

BP.2 BPAE. Control bit which enables address comparison for breakpoints.

CRC (C1H) The DS5001FP provides the option of performing a CRC-16 check of the RAM program contents on power up. The area over which a CRC-16 will be performed (CRC range) and the CRC enable are controlled from this register. The CRC is computed via byte accessible shift registers shown below (C2H and C3H). The previous result of the CRC computation may be cleared as follows. The lsb and msb should be read and saved. Next, the saved lsb result should be written into the lsb register. Finally, the saved msb should be written into the lsb register.

CRC.7–4: CRCRNGE3–0 CRC Range. These bits select a block of memory on 4K boundaries over which the CRC will be performed. The last two bytes of this space will be used to hold the CRC reference value.

CRC.0: CRC. When set, the CRC on power up (or Watchdog) function is performed. In the DS5001FP, these bits may be modified via the ROM program only. In the emulator version, this register is accessible during a breakpoint.

CRCLOW (C2H): Used by the ROM in computing the CRC-16 for a selected RAM space. This register contains the low byte intermediate and final result and may be used by emulator software for a similar purpose.

CRCHIGH (C3H) The most significant byte of CRC intermediate and final result.

BPALSB (C4H) The least significant byte of the Breakpoint Address for comparison with the current address.

BPAMSB (C5H): The most significant byte of the Breakpoint Address for comparison with the current address.

ROMSTAT (D9H) The bit assignment of this register is as follows:

| 7 | 6 | 5 | 4 | 3 | 2 | 1 | 0 |
|---|---|---|---|---|---|---|---|
| FDRV | | IPROG | PSENROM | | AL5001 | | MSL |

ROMSTAT.7: FDRV. When the DS5001 is put in program load mode, there are two methods of loading the program. The serial bootstrap loader is invoked by sending an ASCII carriage return. It returns with a serial prompt. If the RPC mode is invoked (8042 compatible parallel access), the 8042 bus formed by ports 0 and 2 is used. These ports remain undisturbed until this mode is recognized. In order to leave the ports in a nominal state until this mode is established, the FDRV bit is used. When the ROM program determines that the RPC protocol is desired, this bit is set, and the ports are converted into I/O bus structures as shown in the RPC documentation.

ROMSTAT.5: IPROG. Bit reflects the status of the PROG\ pin.

ROMSTAT.4: PSENROM. This bit is set if program load was invoked using RST and PSEN\.

ROMSTAT.2: AL5001. This bit may be used to leave the ROM program when PROG\ was used to enter program load mode.

ROMSTAT.0: MSL Memory Select. Used by the ROM to change program data space into data memory. In this way, program code may be loaded into RAM using MOVX instructions.

ESLSB (DBH) EMULATION STACK LSB. When a breakpoint occurs, the return address is automatically pushed onto the Emulation Stack.

ESMSB (DCH) EMULATION STACK MSB. Most significant byte of the return address.

EDA (DDH) EMULATION DATA A. This is a general purpose register for use by the emulator. It may be used for storage of DPL during a breakpoint.

EDB (DEH) EMULATION DATA B. Another general purpose register for use by the emulator. It may be used for storage of DPH during a breakpoint.

Emulation Features

The DS5004FP provides built in support for breakpoints. A breakpoint may be entered in one of three ways. First, executing an A5H op-code will cause a breakpoint to occur. Second, asserting the HWBP pin with a logic high will cause a breakpoint. Third, executing from the address contained in the Address Compare registers, if address breakpoints are enabled by the BPAE bit, will cause a breakpoint. When a breakpoint occurs, the DS5004FP will complete the current instruction, then push the PC onto the emulation stack. An LJMP to location 2BH is then performed. This would be the location of the breakpoint service routine. To return from the breakpoint, an A5H op-code must be executed. When this op-code is performed during a breakpoint service routine, this instruction performs a return. The Emulation Stack is popped onto the PC. The next in-line instruction will then be performed. The breakpoint may not be interrupted while in progress.

It may be desirable to dump the contents of certain registers for display purposes. In this instance, the DPTR may be saved in Emulation Data A and B. The DPTR would be restored prior to returning from the breakpoint service routine.

If external address compare circuitry is used the HWBP signal may be used to assert a breakpoint. When asserted high, the DS5004FP will vector to location 2BH for a breakpoint service routine. The HWBP must be high for at least one oscillator cycle, but may be held high for up to two machine cycles. By observing the A5I signal, the emulator may determine when the current breakpoint is complete. A predetermined number of single steps may be performed by asserting the HWBP and counting the rising edges of A5I until the desired number is performed.

DS5000 Emulation Mode

The DS5004FP is basically a DS5001FP with certain features replaced by emulation functions. Several resources which are used by the ROM are also available. An added capability is the emulation of the DS5000FP, a previous generation device. For emulation purposes, the primary difference between generations is that the DS5000FP used a different memory structure from the DS5001FP. As a result, the MCON register performs a different function in the DS5000FP. These differences are explained in the respective product data sheets. In addition, the DS5000FP emulation mode disables the following features: RPC (8042 mode); 128K Memory on the Embedded Bus; CRC on power-up and Watchdog; Program loading via the PROG\ pin; Peripheral Enables. In addition, several ROM commands perform differently. When emulating the DS5001FP, the EA\ function is disabled.

Breakpoint Operation and Timing

The breakpoint feature of the DS5004FP operates in a similar manner to an interrupt. However the calling mechanism varies from that of an interrupt. There are two methods of generating a breakpoint. First, the program may include an A5H opcode. This is a previously undefined instruction. The A5 will appear as a single cycle, single byte instruction. It will cause the normal program flow to be interrupted, and an LJMP 2BH to be performed. This location is the entry point for breakpoint routines such as a display update. A second method of entry is to assert the HWBP pin. Asserting this pin between 50 nS after the beginning of an instruction and 50 nS prior to the end of an instruction will cause the equivalent of an A5H on the next instruction. Once a breakpoint is acknowledged, another may not be recognized until the return from breakpoint has been called, and the next instruction has begun execution. Execution of an A5H while in a breakpoint will cause a return to the program flow. The return address is the location which occurs after the last completely executed instruction. Thus holding the HWPB asserted will cause single step operation, with a branch to the breakpoint routine after each.

Timer Operation During Breakpoints

Timer operation is controlled by the TE bit in the Breakpoint Register (C0.4). When set, this bit causes timers to run continuously during a breakpoint. When cleared, this bit causes timers to be stopped during a breakpoint. Note however, that the timer count will appear to correspond to the next instruction, which will be executed on return. This is the result of several design tradeoffs and was unavoidable. In compensating for this feature, the emulation routine must examine the timer operation (are timers running), the timer mode (are timers being automatically reloaded), and the timer count. If timers are running and not reloaded automatically, then the monitor routine must simply decrement the count prior to display. If timers are reloaded automatically, then the count may be decremented unless the reload number is present. In this case, FFH must be placed in the timer register.

NOTABLE INVENTIVE FEATURES

The particular implementation of the claimed invention, in the DS5002 sample embodiment, will now be discussed in greater detail. Of course, it must be understood that the DS5002 embodiment is merely one example of advantageous use of the claimed innovations, which can be used in a wide variety of other contexts.

Figure 11:
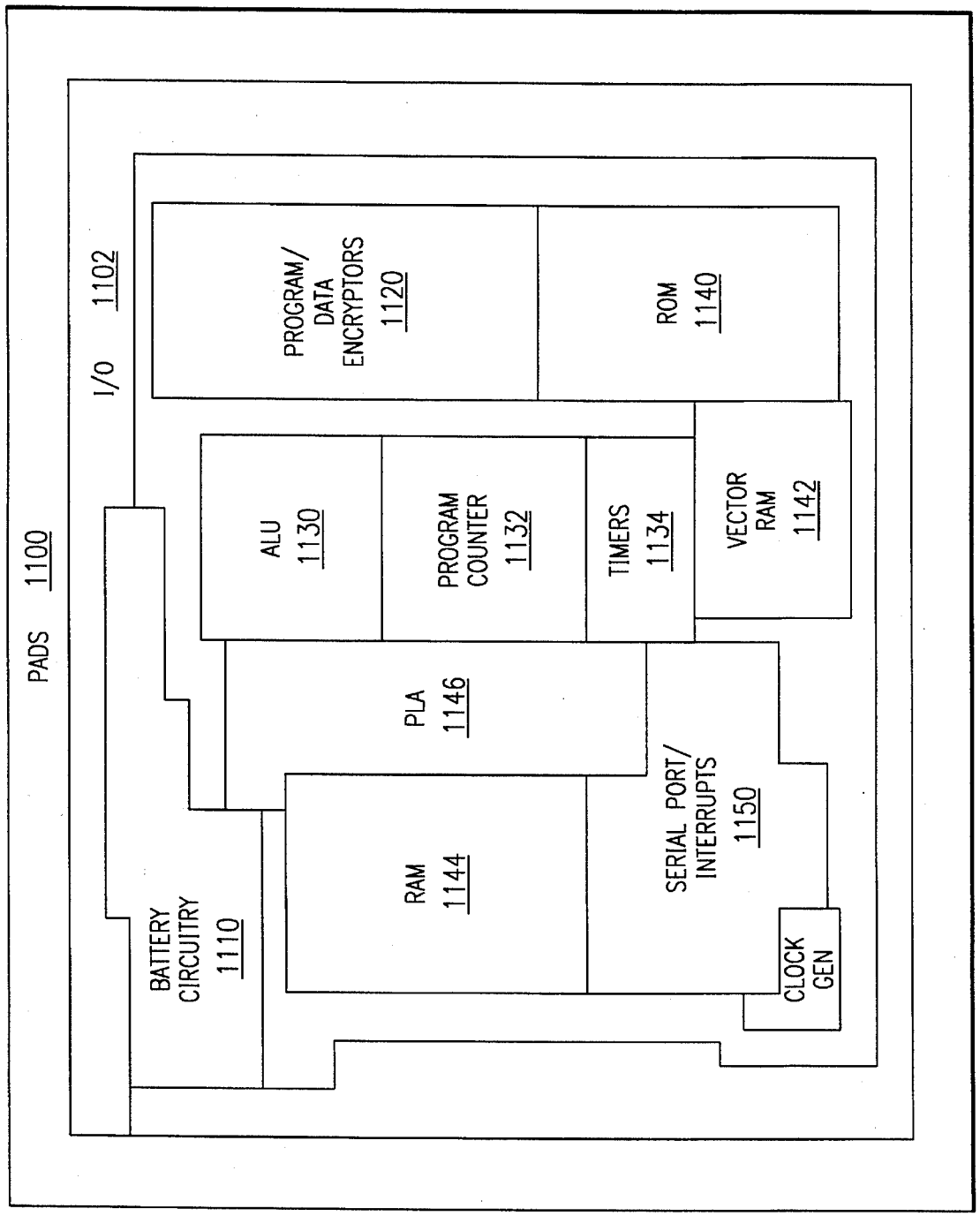
FIG. 11 is a block diagram of the DS5002 microcontroller chip, in the presently preferred embodiment. This diagram is the same as that for the DS5001 embodiment, and is similar to that of the DS5000.

FIG. 11 is a block diagram of the DS5002 microcontroller chip, in the presently preferred embodiment. This diagram is the same as that for the DS5001 embodiment, and is similar to that of the DS5000.

The integrated circuit die is surrounded with contact pads 1100. Adjacent to these are the I/O circuits 1102, including ESD protection structures, input and output buffers, etc.

Battery circuitry 1110 (of which portions are shown in more detail below) provides power-management functions, including power monitoring, and large switching transistors which are controlled so that the on-chip power supply $V_{DD}$, and the off-chip nonvolatile power supply VCCO, can be supplied either from the system power supply input VCCI or from a battery input BAT.

ALU 1130, clock generator 1160, and program counter 1132 cooperate, in conventional fashion, to execute a program from ROM 1140 or vector RAM 1142 (or from external RAM, not shown). Thus, the ALU, together with the PLA 1146 and the program counter 1132, form the core of a central processing unit (CPU). However, one unusual feature is that the encryption circuits 1120 are interposed between the CPU and the accessed data and instruction lines. The PLA 1146 also provides "glue logic" to appropriately transform the outputs of the CPU. Logic 1150 provides a serial port interface, and also provides interrupt management.

The DS5002, like the DS5000T, also includes timing circuits 1134 which can generate an interrupt to the ALU 1130, to cause program branching when a time limit is reached.

Note that the portion shown in FIG. 11 is only the microcontroller chip itself. Preferably, in the presently preferred embodiment, this chip is packaged together with a lithium battery and a low-power SRAM, with the SRAM connected to be powered from the VCCO output of the microcontroller chip.

Figure 12:
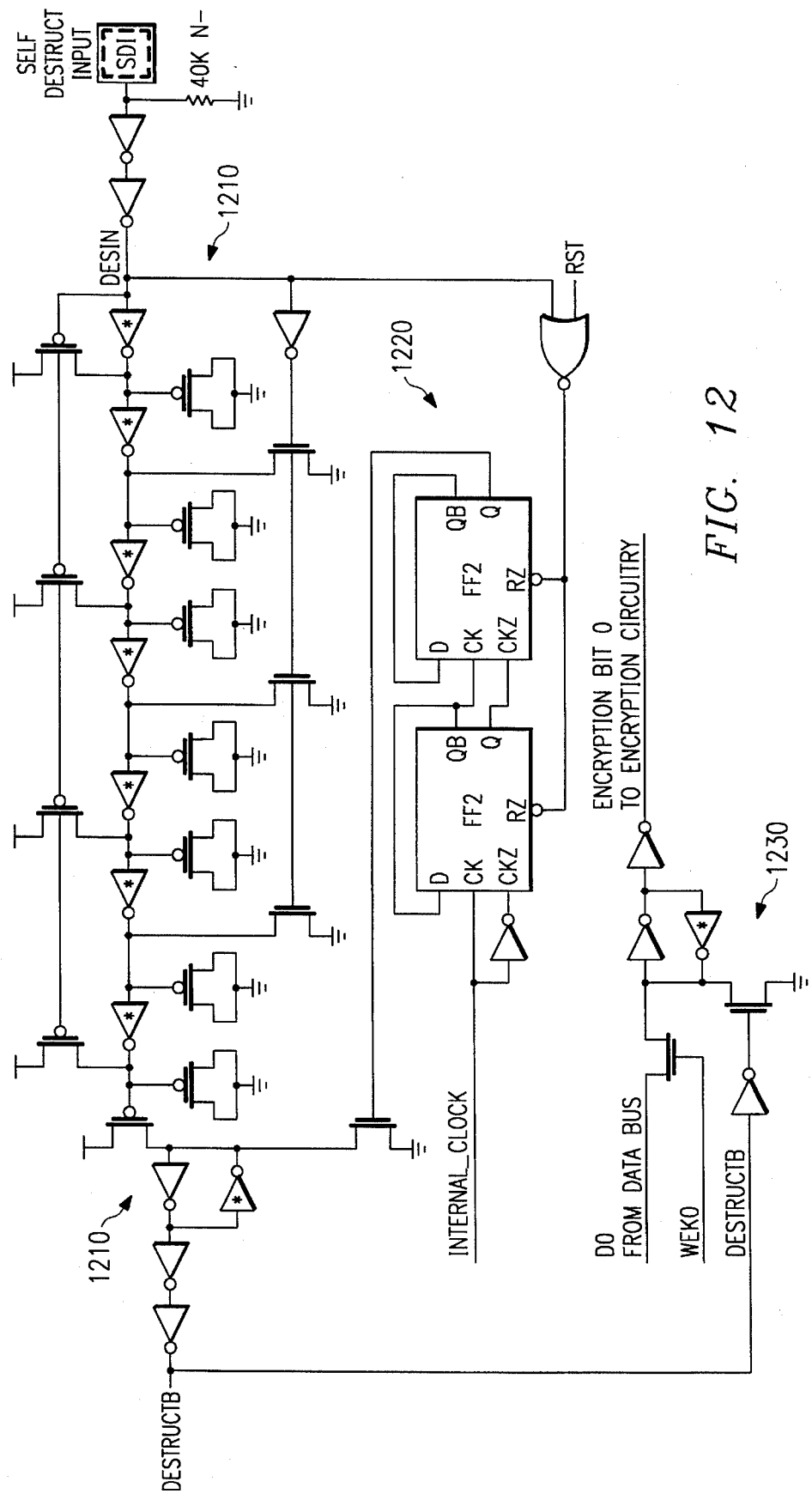
FIG. 12 shows the specific circuitry used to generate the self-destruct signal, in the presently preferred embodiment.

FIG. 12 shows the specific circuitry used to receive the self-destruct signal, in the presently preferred embodiment. Note that the chain of capacitor-loaded inverters 1210 provides a significant time constant, which will avoid the self-destruct cycle from being accidentally triggered. If the SDI pin, after having gone low, goes high again before the signal has propagated all the way through the chain 1210, the reset transistors interspersed in this chain will immediately arrest the propagation of the signal (if it has not already propagated through the chain 1210).

If the signal from SDI high does propagate all the way through the chain 1210, signal DESTRUCT\ will be driven low. This signal is connected to produce several effects, as described below.

The flops 1220 interpose a few clock cycles of delay in clearing the signal DESTRUCT\ after the high level has been removed from pin SDI.

A variety of techniques can be used to generate a signal SDI which indicates that an attempted security violation is occurring. For one example, a very weak current source can be tied to the pin, with a stronger (but still weak) pulldown also connected to the pin, through a meander line which will be broken by intrusion attempts. For another example, a microcontroller as described can be combined with an electronic key, or with another nonvolatile microprocessor or microcontroller (such as a DS5000) which is connected to receive and analyze inputs which may indicate that intrusion is in progress.

The logic 1230 at the bottom of FIG. 12 shows how the DESTRUCT\ signal is connected to control a block write into the encryption registers. The input to each bit of the encryption registers is protected by a pass gate like that shown, so that normally the N-th byte of the encryption register can only be written into if a special write-enable bit WEKN goes high. This will connect data bits D0–D7 from the data bus, to the latch at that encryption register's input. (The circuitry 1230 shown at the bottom of FIG. 12 is the logic for one bit—bit 0—and this logic is replicated to the needed number of bits.) However, when the DESTRUCT\ signal goes low, the latch at each encryption register bit is reset, so that the encryption information is immediately lost.

Figure 13:
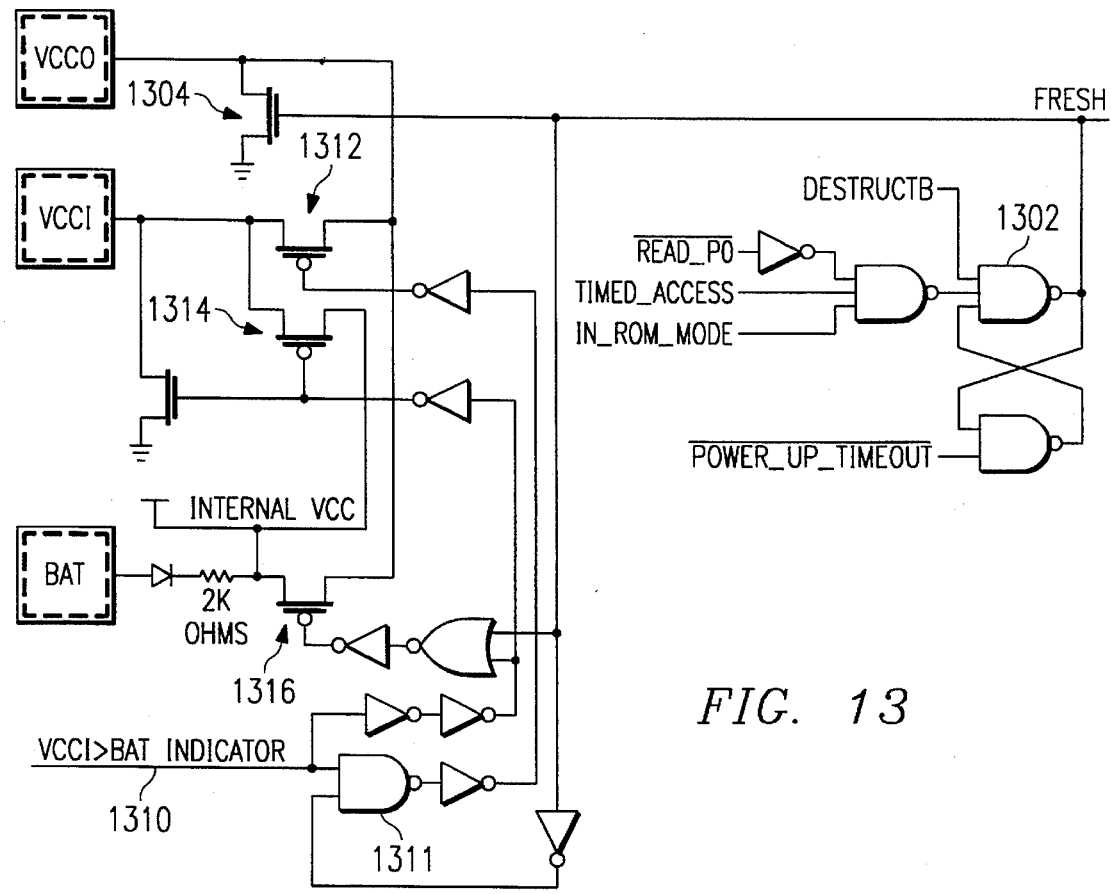
FIG. 13 shows the specific circuitry used for switching the power connections, including the circuitry which grounds the power output pin in freshness mode, in the presently preferred embodiment.

FIG. 13 shows the specific circuitry used for switching the power connections, including the circuitry which grounds the power output pin in freshness mode, in the presently preferred embodiment. If the DESTRUCT\ signal goes low, a NAND gate will drive the freshness signal FRESH high. The FRESH signal is connected to drive an NMOS pulldown transistor 1304, which drives pad VCCO to ground. When the VCCO pad is connected to power an SRAM, this ground connection will cause the data in the SRAM to be destroyed.

The remainder of the circuitry shown is more conventional (or at least more similar to previous products of Dallas Semiconductor). If the logic signal 1310 (derived from a comparator, not shown) indicates that the system power supply input VCCI is higher than the battery voltage, a huge PMOS transistor 1312 will normally be turned on to connect VCCI to VCCO. However, note that, because the complement of signal FRESH is connected to NAND gate 1311, transistor 1312 will not be turned on if FRESH is high. Also, when signal 1310 is high, another large PMOS transistor 1314 will be turned on (whether or not FRESH is high), to connect the chip's own internal power supply lines ($V_{DD}$, or internal $V_{CC}$) to the VCCI pin.

Figure 14:
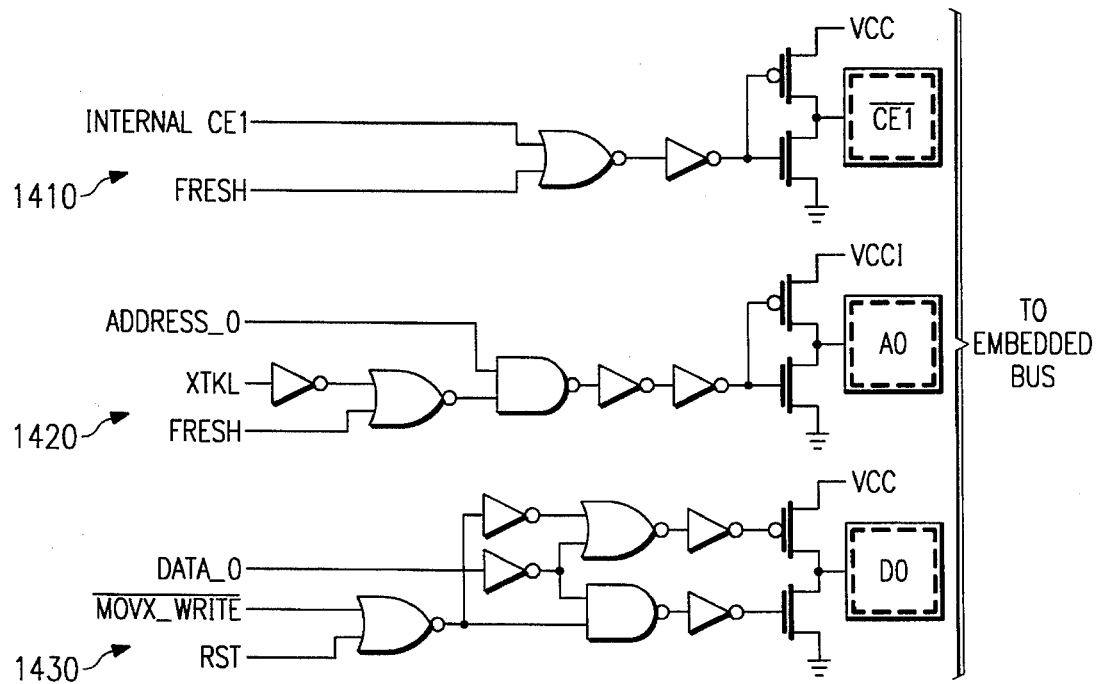
FIG. 14 shows the specific logic used to control the address and CE\ signals (and to control those signals when in freshness mode), in the presently preferred embodiment.

FIG. 14 shows the specific logic used to control the address and CE\ signals (and to control those signals when in freshness mode), in the presently preferred embodiment. Circuitry 1410 interrupts chip-enable signals, and clamps pad CE1\ low, when signal FRESH is high. Circuitry 1420 interrupts address bits (bit A0 in the example shown), and clamps the corresponding pad low (pad A0 in the example shown), when signal FRESH is high. Circuitry 1430 buffers the data bits (bit D0 in the example shown); note that, in the presently preferred embodiment, the connection to the pad is not conditioned on signal FRESH. (The data bus only drives out to the RAM on a write function, and gets turned off at all other times.

The circuitry of FIG. 14 provides additional assurance that the volatile memory will lose its data promptly when VCCO is grounded. In some SRAM architectures, a high level on a chip-enable or address line can pull up enough nodes to maintain at least a standby power supply to the memory array. The circuitry of FIG. 14 prevents this.

Figure 15A:
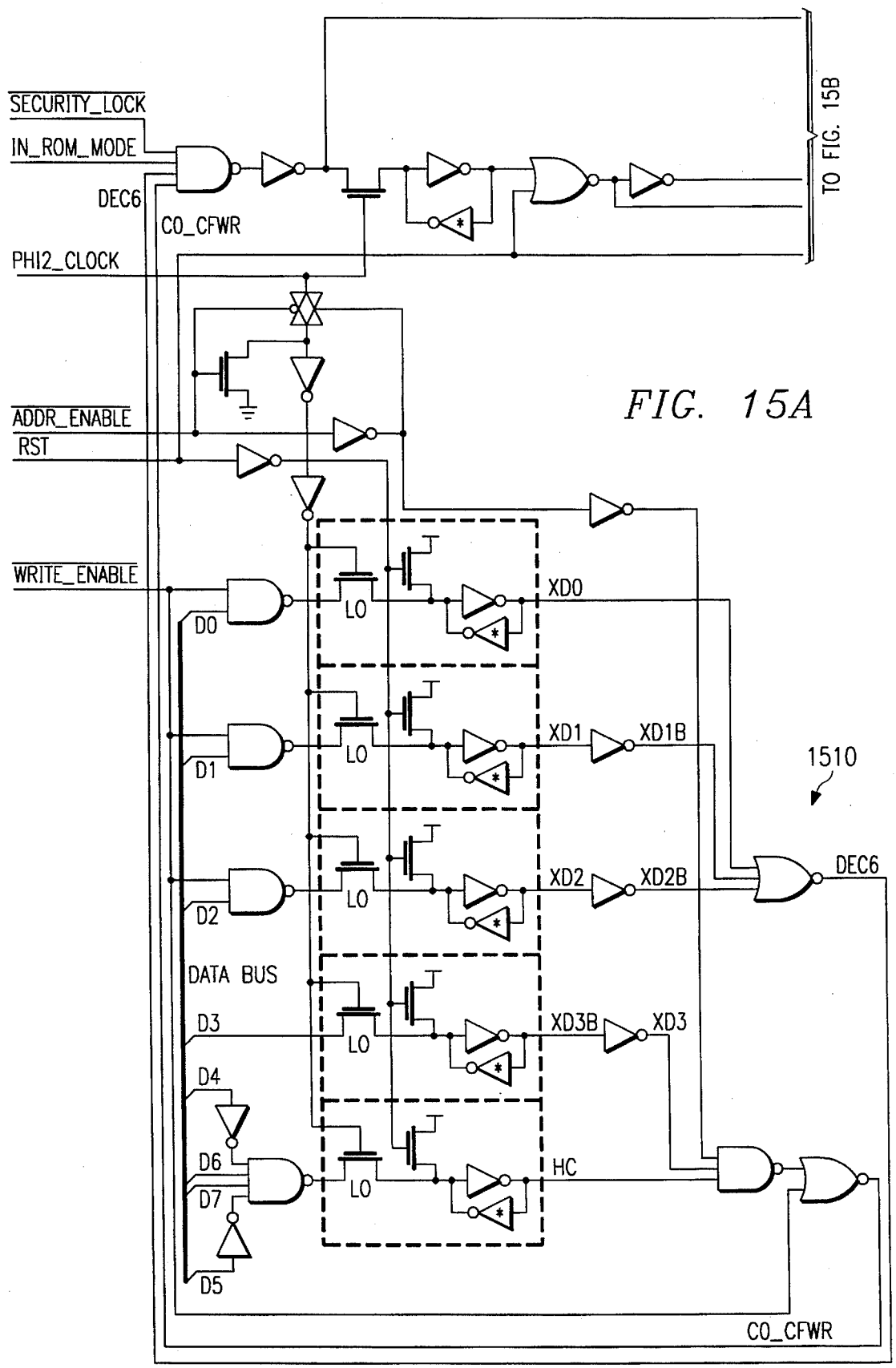
FIG. 15 shows the specific logic used, in the presently preferred embodiment, to layer all of the encryption register data onto a single address location.
Figure 15B:
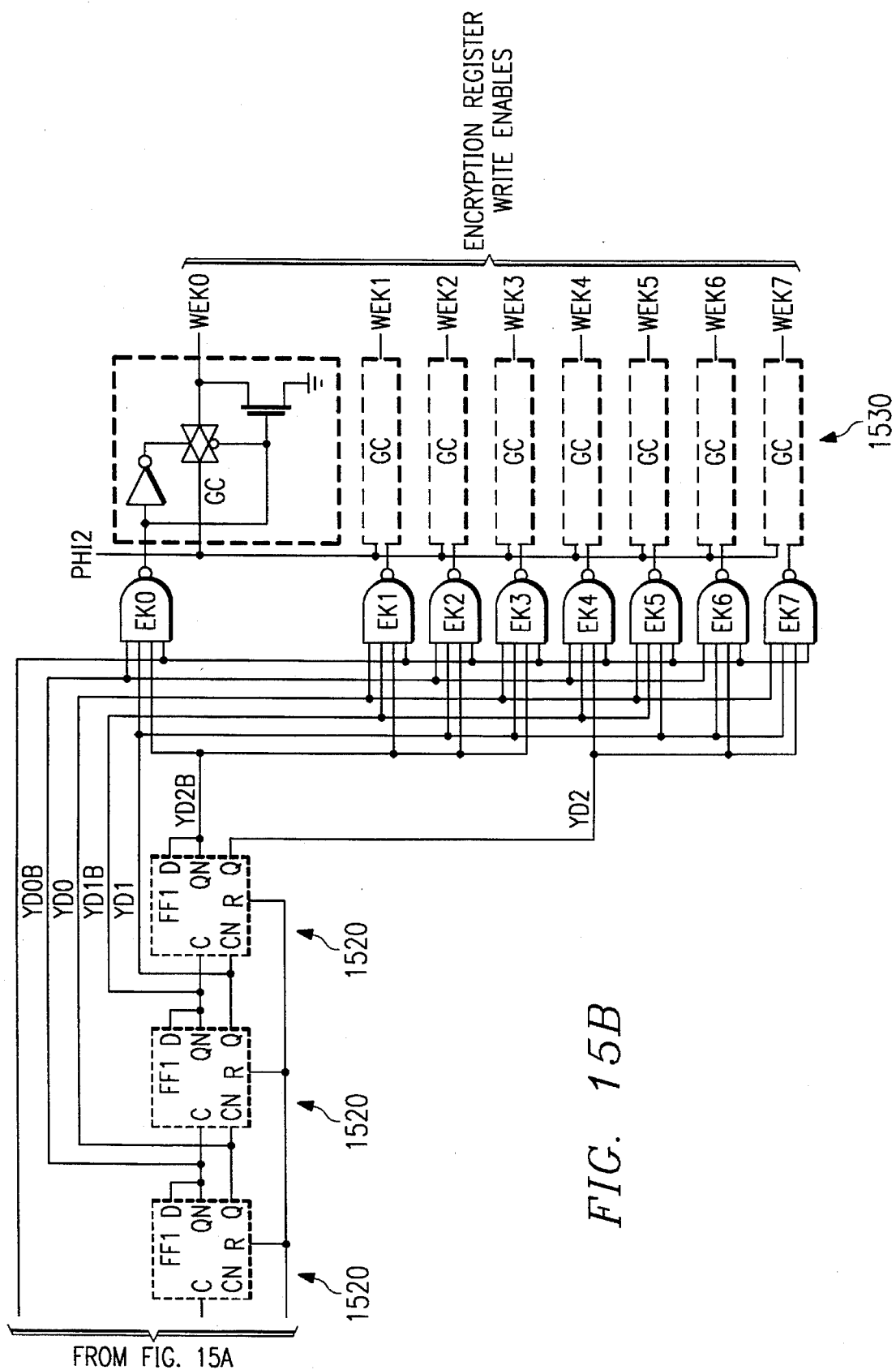

FIG. 15 shows the specific logic used, in the presently preferred embodiment, to layer all of the encryption register data onto a single address location. In the example shown, the decoder logic 1510 is hard-wired so that the address used is $CE_H$. Flops 1520 sequentially route the received data into the eight different encryption registers, and gated clocks 1530 provide parallel transfer.

FURTHER MODIFICATIONS AND VARIATIONS

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

As will be recognized by those skilled in the art, the innovative concepts described in the present application can be modified and varied over a tremendous range of applications, and accordingly their scope is not limited except by the allowed claims.

What is claimed is:

1. A nonvolatile microprocessor-controlled module, comprising:

encryption circuitry, said encryption circuitry including encryption registers;

power management circuitry having power input nodes;

a battery, said power input nodes coupled to said battery and to an external power supply terminal;

a volatile memory;

security violation detectors to detect a security violation;

a microcontroller coupled to supply power via said power management circuitry to said volatile memory and to control said encryption registers, said security violation detectors coupled to said microcontroller;

and wherein when a security violation is detected by said security violation detectors, said security violation detectors rewrite said encryption registers to a known value.

2. The nonvolatile microprocessor-controlled module of claim 1, further comprising:

said security violation detectors emit at least one security violation signal to said microcontroller;

a delay circuit coupled between said security violation detectors and said microcontroller, said delay circuit suppressing propagation of security violation detection signal(s) when said security violation detection signal(s) have a duration less than a preselected minimum duration.

3. The nonvolatile microprocessor-controlled module of claim 1, further wherein when a security violation is detected by said security violation detectors and said security violation detectors rewrite said encryption registers to a known value, said security violation detectors also cuts off power to said volatile memory.

4. The nonvolatile microprocessor-controlled module of claim 3, further wherein said security violation detectors cuts off power to said volatile memory while continuing to supply power to said encryption registers.

5. The nonvolatile microprocessor-controlled module of claim 1, wherein said volatile memory is an external memory to said microcontroller.

6. The nonvolatile microprocessor-controlled module of claim 1, wherein said volatile memory is used to store programs.

7. The nonvolatile microprocessor-controlled module of claim 1, wherein said battery is a 3 volt battery using a lithium chemistry.

8. The nonvolatile microprocessor-controlled module of claim 1, wherein said volatile memory is a CMOS SRAM.

9. The nonvolatile microprocessor-controlled module of claim 1, wherein said volatile memory is partitioned into a first memory subset and a second memory subset.

10. The nonvolatile microprocessor-controlled module of claim 1, wherein said security violation corresponds to an unauthorized tampering with specified equipment.

11. The nonvolatile microprocessor-controlled module of claim 1, further comprising:

said security violation detectors emit at least one security violation signal which is received by said encryption registers, so that said encryption registers are rewritten to a known value; and a delay circuit between said security violation detectors and said encryption registers, said delay circuit suppressing propagation of security violation detection signal(s) emitted by said security violation detectors when said security violation detection signal(s) have a duration less than a preselected minimum duration.

12. The nonvolatile microprocessor-controlled module of claim 1, further comprising:

said security violation detectors emit at least one security violation signal which is received by said power management circuitry, so that power to said volatile memory is cut off; and a delay circuit between said security violation detectors and said encryption registers, said delay circuit suppressing propagation of security violation detection signal(s) emitted by said security violation detectors when said security violation detection signal(s) have a duration less than a preselected minimum duration.

13. The nonvolatile microprocessor-controlled module of claim 2, further comprising:

said security violation detectors emit at least one security violation signal which is received by said power management circuitry that cuts power to said volatile memory; and said delay circuit coupled between said security violation detectors and said power management circuitry.

14. The nonvolatile microprocessor-controlled module of claim 13, further comprising:

said security violation detectors emit at least one security violation signal which is received by said encryption registers, so that said encryption registers are rewritten to a known value; and said delay circuit coupled between said security violation detectors and said encryption registers.

* * * * *

UNITED STATES PATENT AND TRADEMARK OFFICE
CERTIFICATE OF CORRECTION

PATENT NO. : 5,515,540
DATED : May 7, 1996
INVENTOR(S) : Grider et al.

It is certified that error appears in the above-indentified patent and that said Letters Patent is hereby corrected as shown below:

| | |
|---|---|
| Column 1, lines 49-50 | Move the parenthetical "e.g., U.S. Pat. No. 4,168,396 which is hereby incorporated by reference) from after "electronic" in line 49 To after "encryption" but before the comma in line 49 |
| Column 1, line 52 | Replace "flined" With --filed-- |
| Column 5, table line 16 (pin 47) | Replace "Cyrstal" With --Crystal-- |
| Column 8, line 3 | Replace "VLI--0.5" With --VLI - 0.5-- |
| Column 8, line 16 | Replace "Encrypton" With --Encryption-- |
| Column 10, table line 40 | Replace "(AO)" With --(A0)-- |
| Column 11, table line 1 | Replace "P3.5/WR\" With --P3.6/WR\-- |

UNITED STATES PATENT AND TRADEMARK OFFICE
CERTIFICATE OF CORRECTION

PATENT NO.   : 5,515,540
DATED        : May 7, 1996
INVENTOR(S)  : Grider et al.

It is certified that error appears in the above-indentified patent and that said Letters Patent is hereby corrected as shown below:

| | |
|---|---|
| Column 15, table line 1 | Replace "tha" With --the-- |
| Column 15, table line 18 | Replace "is" With --in-- |
| Column 15, table line 23 | After "be" Insert --read-- |
| Column 20, table 3 line 7 | Replace "Red" With --Read-- |
| Column 21, line 50 | Replace "VRS\" With --VRST\-- |

Signed and Sealed this

Eleventh Day of March, 1997

Attest:

BRUCE LEHMAN

*Attesting Officer*    *Commissioner of Patents and Trademarks*